(12) United States Patent
Fang et al.

(10) Patent No.: US 9,986,558 B2
(45) Date of Patent: May 29, 2018

(54) METHOD FOR TRANSMITTING SYSTEM INFORMATION, SYSTEM AND DEVICE

(71) Applicant: ZTE Corporation, Shenzhen, Guangdong (CN)

(72) Inventors: Huiying Fang, Shenzhen (CN); Bo Dai, Shenzhen (CN); Shuqiang Xia, Shenzhen (CN); Jing Shi, Shenzhen (CN); Xincai Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 178 days.

(21) Appl. No.: 14/906,688

(22) PCT Filed: May 9, 2014

(86) PCT No.: PCT/CN2014/077195
§ 371 (c)(1),
(2) Date: Feb. 23, 2016

(87) PCT Pub. No.: WO2014/166447
PCT Pub. Date: Oct. 16, 2014

(65) Prior Publication Data
US 2016/0183250 A1    Jun. 23, 2016

(30) Foreign Application Priority Data

Jul. 25, 2013   (CN) .......................... 2013 1 0316759

(51) Int. Cl.
*H04W 72/00*     (2009.01)
*H04J 3/00*      (2006.01)
(Continued)

(52) U.S. Cl.
CPC ....... *H04W 72/0446* (2013.01); *H04L 5/0007* (2013.01); *H04L 5/0053* (2013.01);
(Continued)

(58) Field of Classification Search
None
See application file for complete search history.

(56) References Cited

U.S. PATENT DOCUMENTS

| | | | |
|---|---|---|---|
| 2009/0245211 A1* | 10/2009 | Kim | H04B 7/2615 370/336 |
| 2014/0315549 A1* | 10/2014 | Zhang | H04W 48/08 455/434 |
| 2015/0358996 A1 | 12/2015 | Fang et al. | |

FOREIGN PATENT DOCUMENTS

| CN | 1411227 A | 4/2003 |
|---|---|---|
| CN | 102104413 A | 6/2011 |

(Continued)

OTHER PUBLICATIONS

International Search Report in international application No. PCT/CN2014/077195, dated Aug. 6, 2014.

(Continued)

*Primary Examiner* — Erika Washington
(74) *Attorney, Agent, or Firm* — Oppedahl Patent Law Firm LLC

(57) ABSTRACT

The disclosure discloses a method for transmitting system information for transmitting system information, a system and a device. The method includes that: a position of a resource for repeatedly sending the system information for repeatedly sending system information in a transmission period for the system information is determined; and the system information is sent on the resource for repeatedly sending the system information for repeatedly sending system information.

15 Claims, 11 Drawing Sheets

(51) Int. Cl.
*H04W 72/04* (2009.01)
*H04L 5/00* (2006.01)
*H04W 48/12* (2009.01)
*H04W 72/02* (2009.01)

(52) U.S. Cl.
CPC .......... *H04L 5/0091* (2013.01); *H04W 48/12* (2013.01); *H04W 72/04* (2013.01); *H04L 5/0094* (2013.01); *H04W 72/02* (2013.01)

(56) References Cited

FOREIGN PATENT DOCUMENTS

| CN | 102469033 A | 5/2012 |
|----|-------------|--------|
| EP | 2945454 A1  | 11/2015 |

OTHER PUBLICATIONS

English Translation of the Written Opinion of the International Search Authority in international application No. PCT/CN2014/077195, dated Aug. 6, 2014.

"3rd Generation Partnership Project; Technical Specification Group Radio Access Network; Study on provision of low-cost MTC UEs based on LTE; (Release 12)", 3GPP Draft; RI-132798_3GPP_TR_36.888, 3rd Generation Partnership Project (3GPP), Mobile Competence Centre ; 650, Route Des Lucioles ; F-06921 Sophia-Antipolis Cedex ;France,Jul. 17, 2013 (Jul. 17, 2013), XP050719772, Retrieved from the Internet:URL: http://www.3gpp.org/ftp/tsg_ran/WG3_lu/TSGR3_81/LSin/ [retrieved on Jul. 17, 2013].

ZTE: "Diminishing returns and coverage improvement summary for TR36.888",3GPP Draft; R1-132110_Final, 3rd Generation Partnership Project (3GPP), Mobile Competence Centre ; 650, Route Des Lucioles ; F-06921 Sophia-Antipolis Cedex ;France vol. RAN WG1, No. Fukuoka, Japan; 20130520-20130524,11 May 2013 (May 11, 2013), XP050697888, Retrieved from the Internet:URL:http://www.3gpp.org/ftp/tsg_ran/WGI_RL I/TSGRI_73/Docs/ [retrieved on May 11, 2013].

China Telecom: "On PRACH Coverage Improvement for Low-cost MTC UE",3GPP Draft; RI-131134, 3rd Generation Partnership Project (3GPP), Mobile Competence Centre ; 650, Route Des Lucioles ; F-06921 Sophia-Antipolis Cedex;France, vol. RAN WG1, No. Chicago, USA; 20130415-201304195 Apr. 2013 (Apr. 5, 2013), XP050696763, Retrieved from the Internet: URL:http://www.3gpp.org/ftp/tsg_ran/WGI RL I/TSGRI_72b/Docs/[retrieved on Apr. 5, 2013].

ZTE: "Coverage Improvement Analysis of Physical Broadcast channel for TR36.888 and text proposal",3GPP Draft; RI-131053, 3rd Generation Partnership Project (3GPP), Mobile Competence Centre ; 650, Route Des Lucioles ; F-06921 Sophia-Antipolis Cedex ;France, vol. RAN WG1, No. Chicago, USA; 20130415-201304196 Apr. 2013 (Apr. 6, 2013), XP050697021, Retrieved from the Internet: URL:http://www.3gpp.org/ftp/tsg_ran/WGI_RL I/TSGRI_72b/Docs/ [retrieved on Apr. 6, 2013].

Samsung: "PBCH coverage enhancements for low-cost M I C UEs", 3GPP Draft; RI-131015 PBCH Coverage Enhancements for MTC, 3rd Generation Partnership Project (3GPP), Mobile Competence Centre ; 650, Route Des Lucioles ; F-06921 Sophia-Antipolis Cedex ;France vol. RAN WG1, No. Chicago, USA; 20130415-201304196 Apr. 2013 (Apr. 6, 2013), XP050696995, Retrieved from the Internet: URL:http://www.3gpp.org/ftp/tsg_ran/WGI_RL I/TSGRI_72b/Docs/ [retrieved on Apr. 6, 2013].

Supplementary European Search Report in European application No. 14782167.2, dated Jun. 13, 2016.

* cited by examiner

METHOD FOR TRANSMITTING SYSTEM INFORMATION, SYSTEM AND DEVICE

TECHNICAL FIELD

The disclosure relates to a Machine Type Communication (MTC) technology in the field of communications, and in particular to a method for transmitting system information, a system and a device.

BACKGROUND

MTC User Equipment (UE), also called Machine-to-Machine (M2M) communication UE, is a mainly applied in the existing Internet of Things. Low power consumption and low cost are important guarantees for its large-scale application. Smart metering type equipment is one of the most typical applications of MTC equipment. Most of smart metering type MTC equipment is fixedly mounted in an environment with low coverage performance, such as a basement. In order to keep normal communication between such MTC equipment and a base station system, deployment of additional equipment such as a station and a relay is required, which may undoubtedly greatly increase deployment cost of an operating company. Smart metering type MTC equipment mainly sends a small data packet, has a low requirement on data rate, and is tolerant to a greater data transmission time delay.

Since smart metering type MTC equipment has an extremely low requirement on data rate, for a data channel, correct transmission of a small data packet may be ensured in manners of lower modulation coding rate, multiple repeated sending in the time domain and the like. For System Frame Number (SFN) information required to be sent to a terminal, frame number information in an existing Long Term Evolution (LTE) system is included in a Master Information Block (MIB), a scheduling period for sending the MIB is 40 ms, and the MIB is sent four times on a broadcast channel of a subframe 0 of each radio frame within 40 ms. As shown in FIG. 1, each of system information coded block 1, system information coded block 2, system information coded block 3 and system information coded block 4 contains complete MIB information, and may be independently decoded. An MIB message in every 40 ms is kept unchanged, and an SFN in the next MIB message may change.

In order to improve coverage performance of an MTC terminal and ensure normal communication between such equipment and a base station system, it is necessary to increase sending times of an MIB within a 40 ms scheduling period. In addition, for some conventional user terminals in a low-coverage environment, it is also necessary to increase sending times of system information, thereby ensuring that the terminals may keep normal communication with the base station system. Since the user terminals with low-coverage in different cells have different coverage enhancement requirements and the user terminals with low-coverage in the same cell may also require different coverage enhancement grades, it is necessary to design corresponding approaches for sending system information with respect to requirements on different grades of coverage enhancement to ensure that the user terminals may correctly receive the corresponding system information.

SUMMARY

In view of this, the embodiments of the disclosure provide a method for transmitting system information, a system and a device to at least solve the abovementioned problems.

An embodiment of the disclosure provides a method for transmitting system information, which includes:

a position of a resource for repeatedly sending the system information in a transmission period for the system information is determined; and the system information is sent on the resource for repeatedly sending the system information.

In the solution, the step that the position of the resource for repeatedly sending the system information in the transmission period for the system information is determined may be implemented as follows: the position of the resource for repeatedly sending the system information in the transmission period for the system information is determined according to repeated transmission times of the resource for repeatedly sending the system information.

In the solution, the position of the resource for repeatedly sending the system information in the transmission period for the system information is characterized in that:

a resource for repeatedly sending the system information corresponding to a high coverage enhancement grade may include a resource for repeatedly sending the system information corresponding to a low coverage enhancement grade, wherein the coverage enhancement grades comprise one or more preset grades, and the coverage enhancement grades respectively correspond to different system information repeated transmission times; and wherein system information repeated transmission times corresponding to the high coverage enhancement grade is bigger than system information repeated transmission times corresponding to the low coverage enhancement grade.

In the solution, the transmission period for the system information may include four radio frames; and the resource for repeatedly sending the system information may be scheduled in each transmission period for the system information or part of transmission periods for the system information of each SFN sending period.

In the solution, the step that the system information is sent on the resource for repeatedly sending the system information may include that:

a base station sends the system information according to a resource for repeatedly sending the system information required by repeated transmission times corresponding to the highest coverage enhancement grade;

or, the base station selects a resource for repeatedly sending the system information required by repeated transmission times corresponding to a coverage enhancement grade corresponding to a local cell to send the system information according to a coverage enhancement requirement of the local cell.

In the solution, the system information may be: one of four system information coded blocks on a broadcast channel in the transmission period for the system information; and the system information coded blocks may be selected as follows: the coded blocks corresponding to the system information repeatedly sent in the radio frames may be the same, or, the coded blocks may be selected for repeated transmission according to a predefined sequence, wherein the repeated transmission times may be a multiple of four, and the transmission period for the system information may include: the four radio frames.

In the solution, selection of the resource for repeatedly sending the system information may include that:

when one subframe of one transmission period for the system information is required to include more than one resource for repeatedly sending the system information, intra-subframe selection is performed and then inter-subframe selection is performed;

or, inter-subframe selection is performed and then intra-subframe selection is performed.

In the solution, a selection principle of subframes corresponding to the resource for repeatedly sending the system information may include that:

subframes of a first half of a frame may be preferably selected;

the subframes of a second half of the frame and the first half of the frame may be selected sequentially alternately; and the subframes may be selected according to a predefined subframe priority sequence.

In the solution, an Orthogonal Frequency Division Multiplexing (OFDM) symbol position of the system information in each subframe may be the same;

or, OFDM symbol positions of the system information in the subframes with the same type may be the same.

In the solution, the step that the system information is sent may include that:

the system information is mapped to frequency-domain positions of the repeated sending resource in other subframes or the same subframe according to an original system information sending frequency-domain position in subframe 0, and a surplus subcarrier is idle if existing; and if system information mapping positions on any OFDM symbol are fewer than system information mapping positions on an original OFDM symbol, the system information is sent after part codes of the information are cancelled.

The embodiment of the disclosure provides a method for transmitting system information, which includes that:

a terminal detects the system information, wherein the system information may include: system information sent on a broadcast channel and system information sent on a resource for repeatedly sending the system information.

In the solution, after the step that the terminal detects the system information, the method may further include that: the terminal determines a coverage enhancement grade, wherein a method for determining the coverage enhancement grade may include that: the terminal determines the coverage enhancement grade according to repetition times corresponding to decoding of the system information;

wherein the coverage enhancement grades comprise one or more preset grades, and the coverage enhancement grades respectively correspond to different system information repeated transmission times; and wherein system information repeated transmission times corresponding to the high coverage enhancement grade is bigger than system information repeated transmission times corresponding to the low coverage enhancement grade.

In the solution, the step that the terminal determines the coverage enhancement grade of the terminal according to the repetition times corresponding to decoding of the system information may include that:

the terminal decodes the system information sent on the broadcast channel, determines that the coverage enhancement grade is not required for coverage enhancement if succeeding in decoding, and performs subsequent operation according to normal steps; and if failing in decoding, the terminal sequentially combines and decodes data received on the broadcast channel and data received on resources for repeatedly sending the system information corresponding to different coverage enhancement grades until succeeding in decoding, and the terminal acquires the coverage enhancement grade of the terminal; or, the terminal determines an initial coverage enhancement grade according to a downlink reference signal or a synchronization channel, and then determines a final coverage enhancement grade according to the lowest corresponding coverage enhancement grade when the system information is successfully decoded.

In the solution, the resource for repeatedly sending the system information may be processed as follows: a position of the resource for repeatedly sending the system information in a transmission period for the system information may be determined according to repeated transmission times of the resource for repeatedly sending the system information.

In the solution, repetition of the resource for repeatedly sending the system information is characterized in that a resource for repeatedly sending the system information corresponding to a high coverage enhancement grade may include a resource for repeatedly sending the system information corresponding to a low coverage enhancement grade, wherein the coverage enhancement grades comprise one or more preset grades, and the coverage enhancement grades respectively correspond to different system information repeated transmission times; and wherein system information repeated transmission times corresponding to the high coverage enhancement grade is bigger than system information repeated transmission times corresponding to the low coverage enhancement grade.

In the solution, the resource for repeatedly sending the system information may be: scheduled in each transmission period for the system information or part of transmission periods for the system information of each SFN sending period.

In the solution, the system information may be: one of four system information coded blocks on the broadcast channel in the transmission period for the system information; and the system information coded blocks may be selected as follows: the coded blocks corresponding to the system information repeatedly sent in radio frames may be the same, or, the coded blocks may be selected for repeated transmission according to a predefined sequence, wherein the repeated transmission times is a multiple of four, and the transmission period for the system information may include: four radio frames.

In the solution, selection of the resource for repeatedly sending the system information may include that:

when one subframe of one transmission period for the system information is required to include more than one resource for repeatedly sending the system information, intra-subframe selection is performed and then inter-subframe selection is performed;

or, inter-subframe selection is performed and then intra-subframe selection is performed.

In the solution, a selection principle of subframes may include that:

subframes of a first half of a frame may be preferably selected;

the subframes of a second half of the frame and the first half of the frame may be selected sequentially alternately; and the subframes may be selected according to a predefined subframe priority sequence.

In the solution, an OFDM symbol position of the system information in each subframe may be the same;

or, OFDM symbol positions of the system information in the subframes with the same type may be the same.

The embodiment of the disclosure further provides a base station, which includes: a processing module and a sending module, wherein the processing module may be configured to determine a position of a resource for repeatedly sending the system information in a transmission period for the system information; and the sending module may be configured to send system information on the resource for repeatedly sending the system information determined by the processing module.

In the solution, the processing module may be configured to determine the position of the resource for repeatedly sending the system information in the transmission period for the system information according to repeated transmission times of the resource for repeatedly sending the system information.

In the solution, the processing module may be configured to set that a resource for repeatedly sending the system information corresponding to a high coverage enhancement grade includes a resource for repeatedly sending the system information corresponding to a low coverage enhancement grade, wherein the coverage enhancement grades comprise one or more preset grades, and the coverage enhancement grades respectively correspond to different system information repeated transmission times; and wherein system information repeated transmission times corresponding to the high coverage enhancement grade is bigger than system information repeated transmission times corresponding to the low coverage enhancement grade.

In the solution, the processing module may be configured to schedule the resource for repeatedly sending the system information in each transmission period for the system information or part of transmission periods for the system information of each SFN sending period; and the transmission period for the system information may include: four radio frames.

In the solution, the sending module may be configured to send the system information according to a resource for repeatedly sending the system information required by repeated transmission times corresponding to the highest coverage enhancement grade; or, select a resource for repeatedly sending the system information required by repeated transmission times corresponding to a coverage enhancement grade to send the system information according to a coverage enhancement requirement of a local cell, wherein the system information may be: one of four system information coded blocks on a broadcast channel in the transmission period for the system information.

In the solution, the sending module may be configured to determine that the coded blocks corresponding to the system information repeatedly sent in the radio frames are the same, or select the coded blocks for repeated transmission according to a predefined sequence, wherein the repeated transmission times may be a multiple of four.

In the solution, the sending module may be configured to, when one subframe of one transmission period for the system information is required to include more than one resource for repeatedly sending the system information, perform intra-subframe selection and then perform inter-subframe selection, or perform inter-subframe selection and then perform intra-subframe selection.

In the solution, the sending module may be configured to store a selection principle of subframes corresponding to the resource for repeatedly sending the system information, wherein the selection principle of the subframes may include that: subframes of a first half of a frame may be preferably selected; the subframes of a second half of the frame and the first half of the frame may be selected sequentially alternately; and the subframes may be selected according to a predefined subframe priority sequence.

In the solution, an OFDM symbol position of the system information in each subframe may be the same; or, OFDM symbol positions of the system information in the subframes with the same type may be the same.

In the solution, the sending module may be configured to map the system information to frequency-domain positions of the repeated sending resource in other subframes or the same subframe according to an original system information sending frequency-domain position in subframe 0, and keep a surplus subcarrier idle if the surplus subcarrier exists; and if system information mapping positions on any OFDM symbol are fewer than system information mapping positions on an original OFDM symbol, send the system information after coding of part of the information is cancelled.

The embodiment of the disclosure further provides a terminal, which includes: a detection module, configured to detect system information, wherein the system information may include: system information sent on a broadcast channel and system information sent on a resource for repeatedly sending the system information.

In the solution, the detection module may further be configured to determine a coverage enhancement grade, wherein a method for determining the coverage enhancement grade may include that: the terminal determines the coverage enhancement grade according to repetition times corresponding to decoding of the system information;

wherein the coverage enhancement grades comprise one or more preset grades, and the coverage enhancement grades respectively correspond to different system information repeated transmission times; and wherein system information repeated transmission times corresponding to the high coverage enhancement grade is bigger than system information repeated transmission times corresponding to the low coverage enhancement grade.

In the solution, the detection module may be configured to decode the system information sent on the broadcast channel, determine that the coverage enhancement grade is not required for coverage enhancement if succeeding in decoding, and perform subsequent operation according to normal steps; and if failing in decoding, sequentially combine and decode data received on the broadcast channel and data received on resources for repeatedly sending the system information corresponding to different coverage enhancement grades until succeeding in decoding, and acquire the coverage enhancement grade of the terminal by the terminal; or, determine an initial coverage enhancement grade according to a downlink reference signal or a synchronization channel, and then determine a final coverage enhancement grade according to the lowest corresponding coverage enhancement grade when the system information is successfully decoded.

In the solution, the detection module may further be configured to determine a position of the resource for repeatedly sending the system information in a transmission period for the system information according to repeated transmission times of the resource for repeatedly sending the system information.

In the solution, the detection module may further be configured to set a resource for repeatedly sending the system information corresponding to a high coverage enhancement grade to include a resource for repeatedly sending the system information corresponding to a low coverage enhancement grade, wherein the coverage enhancement grades comprise one or more preset grades, and the coverage enhancement grades respectively correspond to different system information repeated transmission times; and wherein system information repeated transmission times corresponding to the high coverage enhancement grade is bigger than system information repeated transmission times corresponding to the low coverage enhancement grade.

In the solution, the detection module may be configured to schedule the resource for repeatedly sending the system information in each transmission period for the system information or part of transmission periods for the system information of each SFN sending period.

In the solution, the system information may be: one of four system information coded blocks on the broadcast channel in the transmission period for the system information; and the system information coded blocks may be selected as follows: the coded blocks corresponding to the system information repeatedly sent in radio frames may be the same, or, the coded blocks may be selected for repeated transmission according to a predefined sequence, wherein the repeated transmission times is a multiple of four, and the transmission period for the system information may include: four radio frames.

In the solution, the detection module may be configured to, when one subframe of one transmission period for the system information is required to include more than one resource for repeatedly sending the system information, perform intra-subframe selection and then perform inter-subframe selection; or, perform inter-subframe selection and then perform intra-subframe selection.

In the solution, the detection module may be configured to store a selection principle of subframes, including that: subframes of a first half of a frame may be preferably selected; the subframes of a second half of the frame and the first half of the frame may be selected sequentially alternately; and the subframes may be selected according to a predefined subframe priority sequence.

In the solution, an OFDM symbol position of the system information in each subframe may be the same; or, OFDM symbol positions of the system information in the same subframe type may be the same according to subframe type division.

The embodiment of the disclosure provides a system for transmitting system information, which includes a base station and a terminal, wherein the base station may be the base station in any one of the abovementioned solution; and the terminal may be the terminal in any one of the abovementioned solution.

According to the method, the system and the device for transmitting system information provided by the disclosure, the position of the resource for repeatedly sending the system information in the transmission period for the system information may be determined; and the system information is sent on the resource for repeatedly sending the system information. In such a way, the resource for sending system information may be flexibly deployed according to different coverage requirements, and it may be ensured that the terminal adaptively detects the corresponding coverage enhancement grade on the premise of reducing system overhead of the base station as much as possible.

DETAILED DESCRIPTION

In order to make the technical problem to be solved, technical solutions and advantages of the disclosure clearer, detailed description will be given below with reference to the drawings and specific embodiments.

The disclosure will further be described below with reference to the drawings and specific embodiments in detail.

Figure 2:
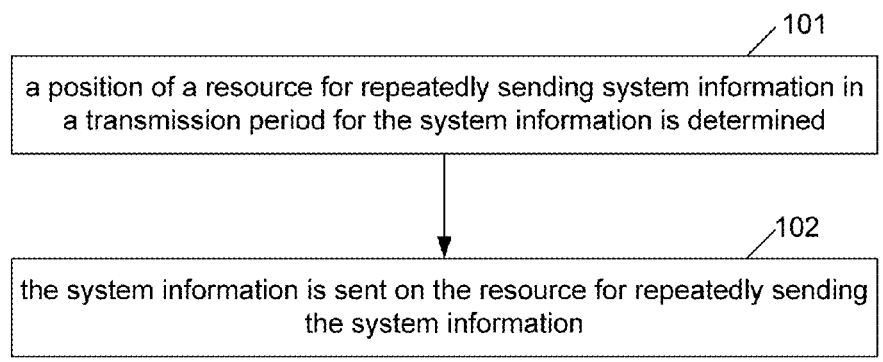
FIG. 2 is a first flowchart of a method for transmitting system information at a base station side according to an embodiment of the disclosure.

An operating flow of a method for transmitting system information according to the embodiment of the disclosure at a network side, as shown in FIG. 2, includes the following steps.

Step 201: a position of a resource for repeatedly sending the system information in a transmission period for the system information is determined.

Specifically, the position of the resource for repeatedly sending the system information in the transmission period for the system information is determined according to repeated transmission times of the resource for repeatedly sending the system information.

Here, the position of the resource for repeatedly sending the system information in the transmission period for the system information is characterized in that:

a resource for repeatedly sending the system information corresponding to a high coverage enhancement grade includes a resource for repeatedly sending the system information corresponding to a low coverage enhancement grade, wherein the coverage enhancement grades comprise one or more preset grades, and coverage enhancement grades respectively correspond to different system information repeated transmission times; and wherein system information repeated transmission times corresponding to the high coverage enhancement grade is bigger than system information repeated transmission times corresponding to the low coverage enhancement grade.

The transmission period for the system information includes four radio frames.

The resource for repeatedly sending the system information is scheduled in each transmission period for the system information or part of transmission period for the system information of each SFN sending period.

Step 202: the system information is sent on the resource for repeatedly sending the system information.

Specifically, a base station sends the system information according to a resource for repeatedly sending the system information required by repeated transmission times corresponding to the highest coverage enhancement grade.

Alternatively, the base station selects a resource for repeatedly sending the system information required by repeated transmission times corresponding to a coverage enhancement grade corresponding to a local cell to send the system information according to a coverage enhancement requirement of the local cell.

Here, the system information is one of four system information coded blocks on a broadcast channel in the transmission period for the system information; and the system information coded block is selected as the same one as a coded block corresponding to the system information repeatedly sent in a radio frame, or the system information coded block is selected according to a predefined sequence, wherein the repeated transmission times is a multiple of four.

Selection of the resource for repeatedly sending the system information includes that: when one subframe of one transmission period for the system information is required to include more than one resource for repeatedly sending the system information, intra-subframe selection is performed and then inter-subframe selection is performed; or, inter-subframe selection is performed and then intra-subframe selection is performed.

A selection principle of subframes corresponding to the resource for repeatedly sending the system information includes that: subframes of a first half of a frame are preferably selected; the subframes of a second half of the frame and the first half of the frame are sequentially alternately selected; and the subframes are selected according to a predefined subframe priority sequence.

When a subframe of a radio frame includes only one resource for repeatedly sending the system information, the predefined subframe priority sequence specifically includes: subframe priorities 5, 9, 4, 8, 3, 7, 2, 6, 1; or 5, 9, 4, 8, 3, 7, 6, 1, 2; or 5, 9, 4, 8, 3, 6, 1, 7, 2; or 5, 9, 4, 6, 1, 8, 3, 7, 2; or 5, 9, 8, 7, 6, 1, 4, 3, 2; or 5, 6, 1, 9, 4, 8, 3, 7, 2; or 5, 6, 1, 9, 8, 7, 4, 3, 2.

Furthermore, when a subframe of a radio frame includes multiple resources for repeatedly sending the system information, the predefined subframe priority sequence specifically includes: subframe priorities 0, 5, 9, 4, 8, 3; or 0, 5, 9, 4, 6, 1; or 0, 5, 9, 8, 7, 6; or 0, 5, 6, 1, 9, 4; or 0, 5, 6, 1, 9, 8, wherein priorities 0 and 5 may be exchanged.

The system information in each subframe has the same OFDM symbol position; or, OFDM symbol positions of the system information in the subframes with the same subframe type are the same. Furthermore, classification of subframe types includes: subframe 0 and subframe 5 are classified into one type, and the other subframes are classified into the other type; or, subframe 0 and subframe 5 are classified into one type, subframe 1 and subframe 6 are classified into the other type, and the other subframes are classified into another type; or, subframe 0 and subframe 5 are classified into one type, subframe 1 is classified into the other type, subframe 6 is classified into another type, and the other subframes are classified into another type; or, subframe 0 and subframe 5 are classified into one type, subframe 1 is classified into the other type, and the other subframes are classified into another type.

The step that the system information is sent includes that: the system information is mapped to frequency-domain positions of the resource for repeatedly sending in the other subframes or the same subframe according to an original frequency-domain position for sending system information in subframe 0, and a surplus subcarrier is idle if any; and if system information mapping positions on any OFDM symbol are fewer than system information mapping positions on an original OFDM symbol, the system information with part codes cancelled is sent.

Figure 3:
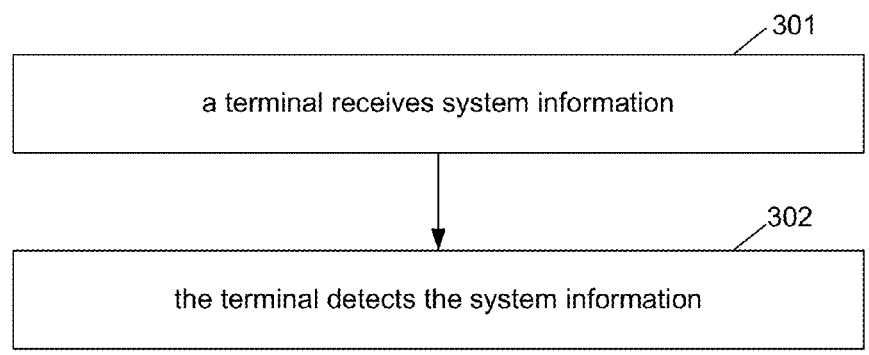
FIG. 3 is a first flowchart of a method for transmitting system information at a terminal side according to an embodiment of the disclosure.

An operating flow of the method for transmitting system information provided by the embodiment of the disclosure at a terminal side, as shown in FIG. 3, includes:

Step 301: a terminal receives system information; and

Step 302: the terminal detects the system information, wherein the system information includes: system information sent on a broadcast channel and system information sent on a resource for repeatedly sending the system information.

Preferably, after the terminal detects the system information in Step 302, the method may further include that: the terminal determines information about its own coverage enhancement grade. The information about the coverage enhancement grade includes repetition times corresponding to decoding of the system information.

The coverage enhancement grades comprise one or more preset grades, and coverage enhancement grades respectively correspond to different system information repeated transmission times, and wherein system information repeated transmission times corresponding to the high coverage enhancement grade is bigger than system information repeated transmission times corresponding to the low coverage enhancement grade.

Specifically, the terminal decodes the system information sent on the broadcast channel, determines that there is no coverage enhancement required for the coverage enhancement if succeeding in decoding, and performs subsequent operation according to normal steps; and If failing in decoding, the terminal sequentially combines and decodes data received on the broadcast channel and data received on resources for repeatedly sending the system information corresponding to different coverage enhancement grades until succeeding in decoding, and the terminal acquires the coverage enhancement grade of the terminal; or, the terminal determines an initial coverage enhancement grade according to a downlink reference signal or a synchronization channel, and then determines a final coverage enhancement grade according to the lowest coverage enhancement grade correspondingly when the system information is successfully decoded.

The resource for repeatedly sending the system information is characterized in that a resource for repeatedly sending the system information corresponding to a high coverage enhancement grade includes a resource for repeatedly sending the system information corresponding to a low coverage enhancement grade, wherein the coverage enhancement grades comprise one or more preset grades, and coverage enhancement grades respectively correspond to different system information repeated transmission times; and wherein system information repeated transmission times corresponding to the high coverage enhancement grade is bigger than system information repeated transmission times corresponding to the low coverage enhancement grade.

The resource for repeatedly sending the system information is processed as follows: a position of the resource for repeatedly sending the system information in a transmission period for the system information is determined according to repeated transmission times of the resource for repeatedly sending the system information.

The resource for repeatedly sending the system information is scheduled in each transmission period for the system information or part of transmission period for the system information of each SFN sending period.

The system information is one of four system information coded blocks on the broadcast channel in the transmission period for the system information; and the system information coded blocks are selected as the same one as a coded block corresponding to the system information repeatedly sent in a radio frame, or the system information coded block is selected according to a pre-defined sequence, wherein the repeated transmission times is a multiple of four.

Selection of the resource for repeatedly sending the system information includes that: when one subframe of one transmission period for the system information is required to include more than one resource for repeatedly sending the system information, intra-subframe selection is performed and then inter-subframe selection is performed; or, inter-subframe selection is performed and then intra-subframe selection is performed.

A selection principle of subframes includes that: subframes of a first half of a frame are preferably selected; the subframes of a second half of the frame and the first half of the frame are sequentially alternately selected; and the subframes are selected according to a predefined subframe priority sequence.

An OFDM symbol position of the system information in each subframe is the same; or, OFDM symbol positions of the system information in the subframes with the same subframe type are the same.

When a subframe of a radio frame includes only one resource for repeatedly sending the system information, the predefined subframe priority sequence specifically includes: subframe priorities 5, 9, 4, 8, 3, 7, 2, 6, 1; or 5, 9, 4, 8, 3, 7, 6, 1, 2; or 5, 9, 4, 8, 3, 6, 1, 7, 2; or 5, 9, 4, 6, 1, 8, 3, 7, 2; or 5, 9, 8, 7, 6, 1, 4, 3, 2; or 5, 6, 1, 9, 4, 8, 3, 7, 2; or 5, 6, 1, 9, 8, 7, 4, 3, 2.

Furthermore, when a subframe of a radio frame includes multiple resources for repeatedly sending the system information, the predefined subframe priority sequence specifically includes: subframe priorities 0, 5, 9, 4, 8, 3; or 0, 5, 9, 4, 6, 1; or 0, 5, 9, 8, 7, 6; or 0, 5, 6, 1, 9, 4; or 0, 5, 6, 1, 9, 8, wherein priorities 0 and 5 may be exchanged.

Further, classification of subframe types includes: subframe 0 and subframe 5 are classified into one type, and the other subframes are classified into the other type; or, subframe 0 and subframe 5 are classified into one type, subframe 1 and subframe 6 are classified into the other type, and the other subframes are classified into another type; or, subframe 0 and subframe 5 are classified into one type, subframe 1 is classified into the other type, subframe 6 is classified into another type, and the other subframes are classified into another type; or, subframe 0 and subframe 5 are classified into one type, subframe 1 is classified into the other type, and the other subframes are classified into another type.

Figure 4:
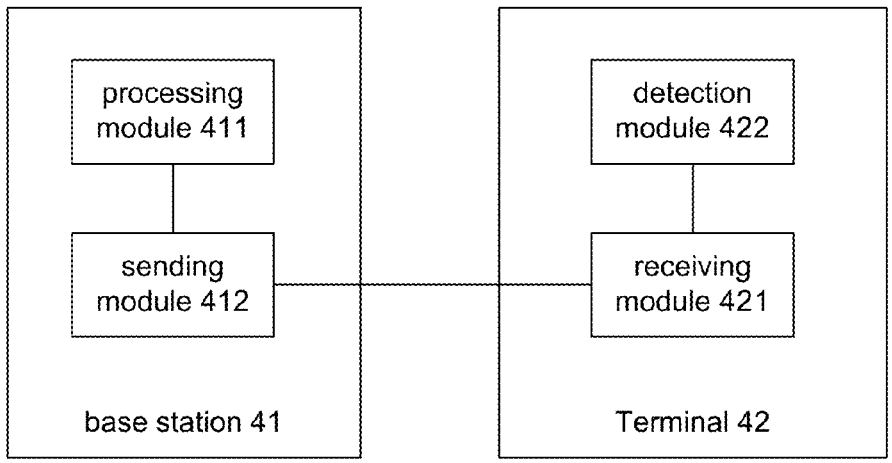
FIG. 4 is a structure diagram of a system for transmitting system information according to an embodiment of the disclosure.

A system for transmitting system information according to the embodiment of the disclosure, as shown in FIG. 4, includes: a base station 41 and a terminal 42.

The base station 41 is configured to determine a position of a resource for repeatedly sending the system information in a transmission period for the system information, and send the system information to the terminal on the resource for repeatedly sending the system information.

The terminal 42 is configured to check the system information transmitted by the base station, wherein the system information includes: system information sent on a broadcast channel and system information sent on the resource for repeatedly sending the system information.

The base station 41 includes a processing module 411 and a sending module 412.

The processing module 411 is configured to determine the position of the resource for repeatedly sending the system information in the transmission period for the system information.

The sending module 412 is configured to send the system information on the resource for repeatedly sending the system information determined by the processing module 411.

The processing module 411 is configured to determine the position of the resource for repeatedly sending the system information in the transmission period for the system information according to repeated transmission times of the resource for repeatedly sending the system information.

The processing module 411 is configured to set a resource for repeatedly sending the system information corresponding to a high coverage enhancement grade to include a resource for repeatedly sending the system information corresponding to a low coverage enhancement grade, wherein the coverage enhancement grades comprise one or more preset grades, and coverage enhancement grades respectively correspond to different system information repeated transmission times; and wherein system information repeated transmission times corresponding to the high coverage enhancement grade is bigger than system information repeated transmission times corresponding to the low coverage enhancement grade.

The transmission period for the system information includes four radio frames.

The processing module 411 is configured to schedule the resource for repeatedly sending the system information in each transmission period for the system information or part of transmission period for the system information of each SFN sending period.

The sending module 412 is configured to send the system information according to a resource for repeatedly sending the system information required by repeated transmission times corresponding to the highest coverage enhancement grade; or, select a resource for repeatedly sending the system information required by repeated transmission times corresponding to a coverage enhancement grade to send the system information according to a coverage enhancement requirement of a local cell.

The system information is one of four system information coded blocks on a broadcast channel in the transmission period for the system information; and the system information coded block is selected as a coded block corresponding to the system information repeatedly sent in a radio frame for repeated transmission, or, the system information coded block is selected according to a predefined sequence, wherein the times of repeated transmission is a multiple of four.

The sending module 412 is configured to, when one subframe of one transmission period for the system information is required to include more than one resource for repeatedly sending the system information, perform intra-subframe selection and then perform inter-subframe selection, or perform inter-subframe selection and then perform intra-subframe selection.

A selection principle of subframes includes that: subframes of a first half of a frame are preferably selected; the subframes of a second half of the frame and the first half of the frame are sequentially alternately selected; and the subframes are selected according to a predefined subframe priority sequence.

An OFDM symbol position of the system information in each subframe is the same; or, OFDM symbol positions of the system information in the subframes with the same subframe type are the same.

The sending module 412 is configured to map the system information to frequency-domain positions of the resource for repeatedly sending in other subframes or the same subframe according to an original frequency-domain position for sending system information in subframe 0, and keep a surplus subcarrier idle if the surplus subcarrier exists; and if system information mapping positions on any OFDM symbol are fewer than system information mapping positions on an original OFDM symbol, send the system information with part codes cancelled.

The terminal 42 includes:

a receiving module 421, configured to receive the system information; and a detection module 422, configured to detect the system information, wherein the system information includes: the system information sent on the broadcast channel and the system information sent on the resource for repeatedly sending the system information.

The detection module 422 is configured to determine a coverage enhancement grade of the terminal according to repetition times corresponding to decoding of the system information.

The coverage enhancement grades comprise one or more preset grades, and coverage enhancement grades respectively correspond to different system information repeated transmission times, and wherein system information repeated transmission times corresponding to the high coverage enhancement grade is bigger than system information repeated transmission times corresponding to the low coverage enhancement grade.

The detection module 422 is configured to decode the system information sent on the broadcast channel, determine that there is no coverage enhancement required for the coverage enhancement if succeeding in decoding, and perform subsequent operation according to normal steps; and if failing in decoding, sequentially combine and decode data received on the broadcast channel and data received on resources for repeatedly sending the system information corresponding to different coverage enhancement grades until succeeding in decoding, and acquire the coverage enhancement grade of the terminal by the terminal; or, determine an initial coverage enhancement grade according to a downlink reference signal or a synchronization channel, and then determine a final coverage enhancement grade according to the lowest corresponding coverage enhancement grade when the system information is successfully decoded.

The detection module 422 is configured to determine the position of the resource for repeatedly sending the system information in the transmission period for the system information according to the repeated transmission times of the resource for repeatedly sending the system information.

The detection module is configured to set a resource for repeatedly sending the system information corresponding to a high coverage enhancement grade to include a resource for repeatedly sending the system information corresponding to a low coverage enhancement grade.

The coverage enhancement grades comprise one or more preset grades, and coverage enhancement grades respectively correspond to different system information repeated transmission times; and wherein system information repeated transmission times corresponding to the high coverage enhancement grade is bigger than system information repeated transmission times corresponding to the low coverage enhancement grade.

The detection module 422 is configured to schedule the resource for repeatedly sending the system information in each transmission period for the system information or part of transmission period for the system information of each SFN sending period.

The system information is one of four system information coded blocks on the broadcast channel in the transmission period for the system information; and the system information coded block is selected as the same one as a coded block corresponding to the system information repeatedly sent in a radio frame, or the system information coded block is selected according to a predefined sequence, wherein the repeated transmission times is a multiple of four.

The detection module 422 is configured to, when one subframe of one transmission period for the system information is required to include more than one resource for repeatedly sending the system information, perform intra-subframe selection and then perform inter-subframe selection; or, perform inter-subframe selection and then perform intra-subframe selection.

A selection principle of subframes includes that: subframes of a first half of a frame are preferably selected; the subframes of a second half of the frame and the first half of the frame are sequentially alternately selected; and the subframes re selected according to a predefined subframe priority sequence.

An OFDM symbol position of the system information in each subframe is the same; or, OFDM symbol positions of the system information in the subframes with the same subframe type are the same.

Embodiment 1

The embodiment describes and illustrates system information transmission implemented by adopting a method for transmitting system information according to the disclosure in a Frequency Division Duplexing (FDD) system in detail.

Figure 5:
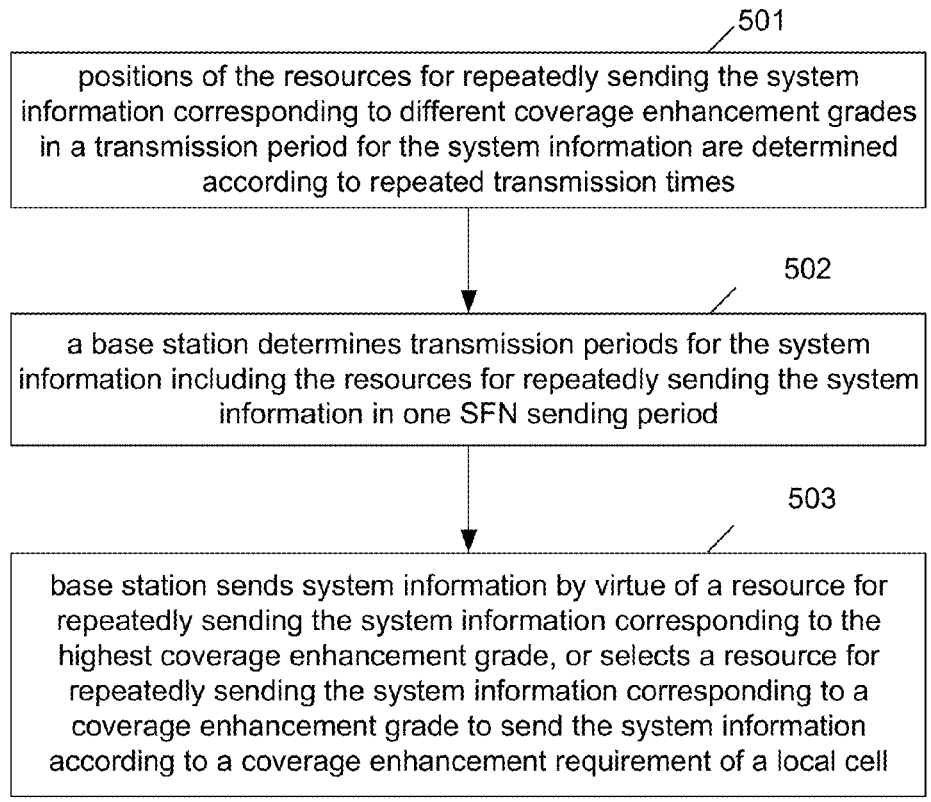
FIG. 5 is a second flowchart of a method for transmitting system information at a base station side according to an embodiment of the disclosure.

As shown in FIG. 5, specific processing steps at a base station side include the following steps.

Step 501: positions of resources for repeatedly sending the system information corresponding to different coverage enhancement grades in a transmission period for the system information are determined according to repeated transmission times.

Herein, the transmission period for the system information includes four radio frames.

A resource for repeatedly sending the system information corresponding to a high coverage enhancement grade includes: a resource for repeatedly sending the system information corresponding to a low coverage enhancement grade, wherein the high coverage enhancement grade corresponds to a large repetition times, and the low coverage enhancement grade corresponds to a small repetition times.

Figure 7A:
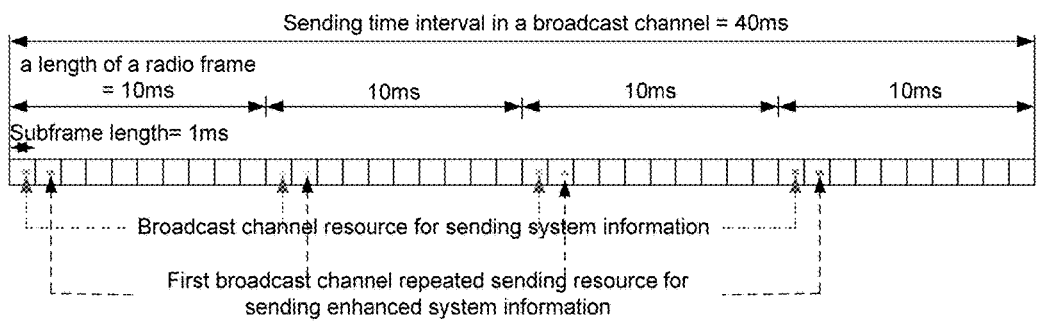
FIG. 7 is a first diagram of resources for repeatedly sending the system information corresponding to multiple coverage enhancement grades in a method for transmitting system information according to the disclosure.
Figure 7B:
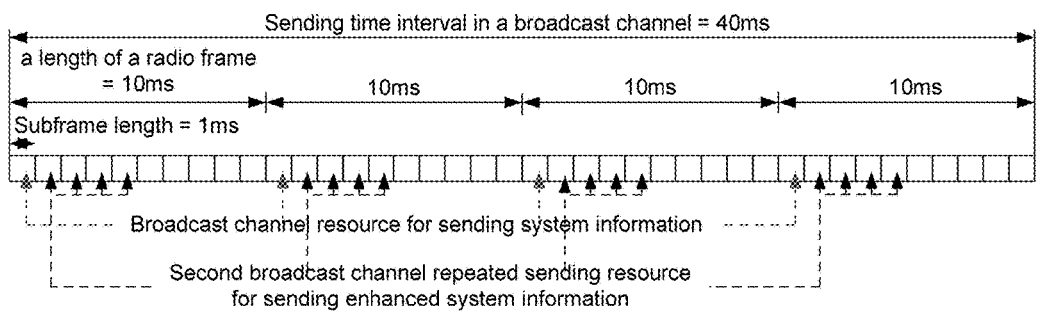
Figure 7C:
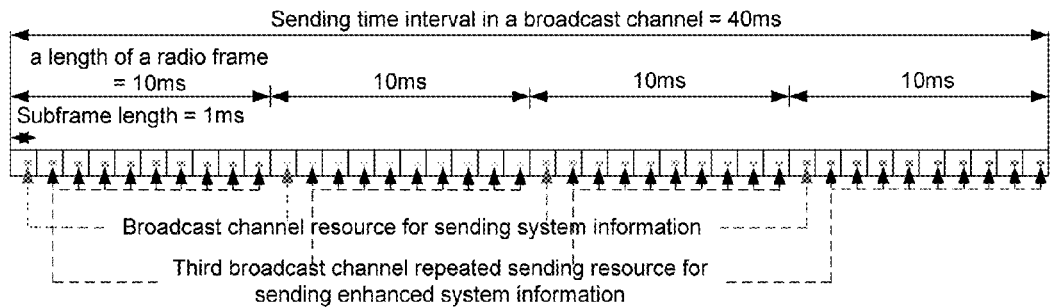
Figure 8A:
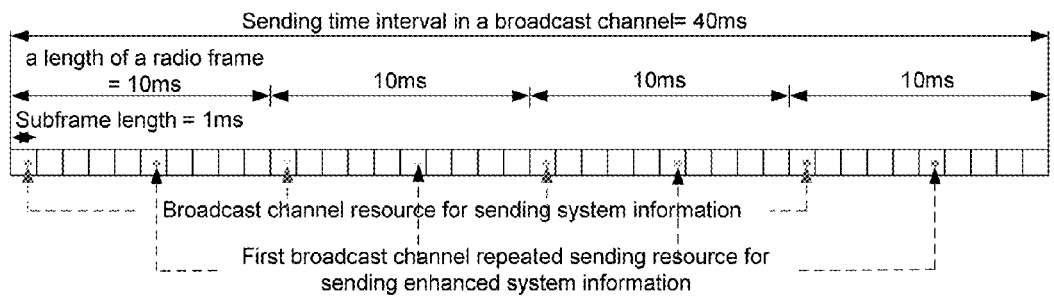
FIG. 8 is a second diagram of resources for repeatedly sending the system information corresponding to multiple coverage enhancement grades in a method for transmitting system information according to the disclosure.
Figure 8B:
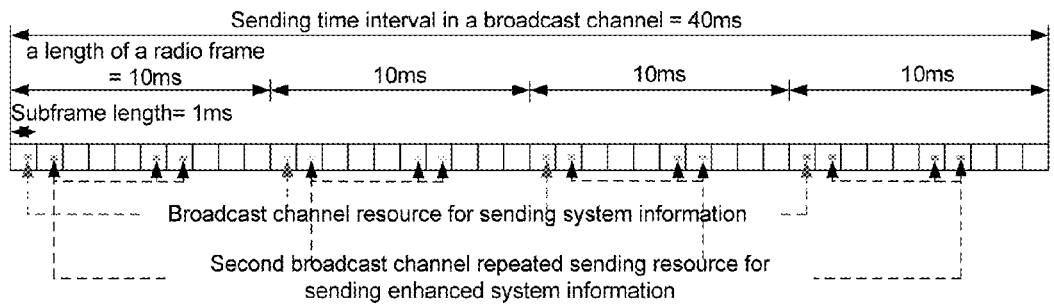
Figure 8C:
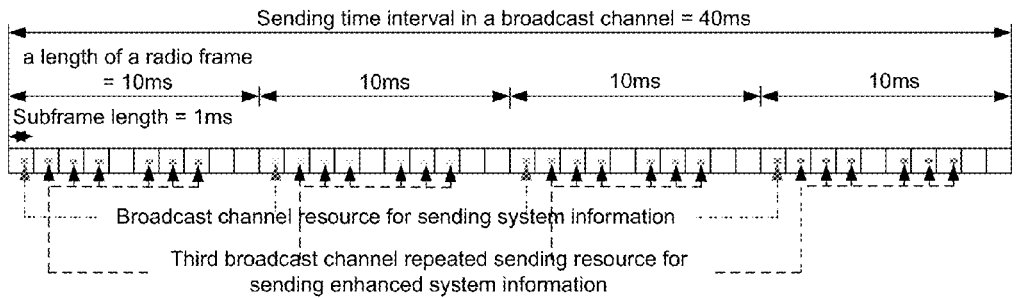
Figure 8D:
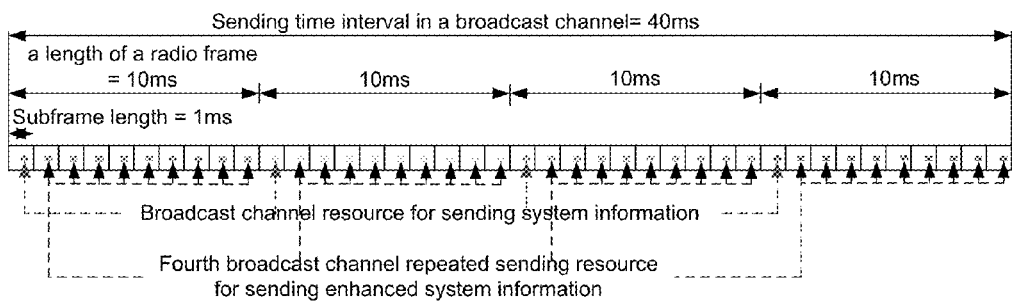

In the embodiment, allocation of resources for repeatedly sending the system information corresponding to multiple coverage enhancement grades is shown in FIG. 4. In the embodiment, there are totally three coverage enhancement grades, the repeated transmission times is a multiple of four, and the repeated transmission times corresponding to coverage enhancement grades 1, 2 and 3 are sequentially 4, 16 and 36. The resource for repeatedly sending the system information corresponding to coverage enhancement grade 1 is shown in FIG. 7(a), and the resource for repeatedly sending the system information corresponding to coverage enhancement grade 2 includes the resource for repeatedly sending the system information corresponding to coverage enhancement grade 1, as shown in FIG. 7(b); and the resource for repeatedly sending the system information corresponding to coverage enhancement grade 3 includes the resource for repeatedly sending the system information corresponding to coverage enhancement grade 2, as shown in FIG. 7(c).

Subframes including the resource for repeatedly sending the system information are selected from a radio frame according to a principle that subframes of a first half of the frame are preferably selected. An OFDM symbol position of the system information in each subframe is the same.

Step 502: a base station determines transmission periods for the system information including resources for repeatedly sending the system information in an SFN sending period.

Figure 11A:
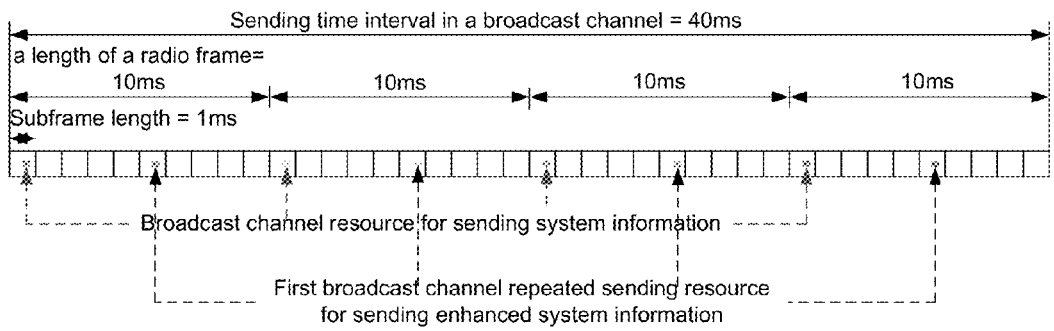
FIG. 11 is a fifth diagram of resources for repeatedly sending the system information corresponding to multiple coverage enhancement grades in a method for transmitting system information according to the disclosure.
Figure 11B:
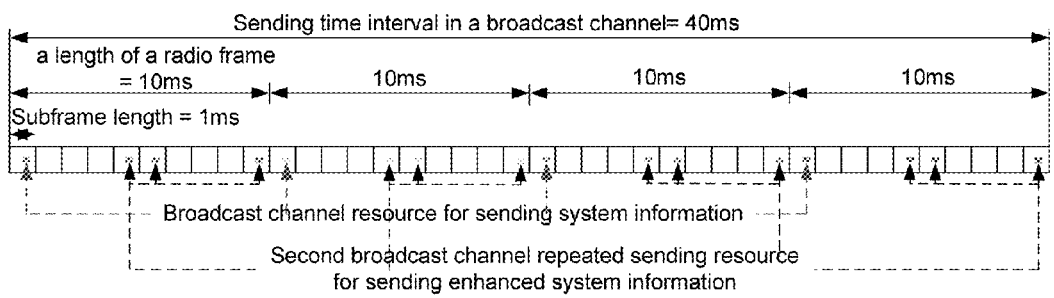

The SFN sending period includes 1,024 radio frames. As shown in FIG. 10, all the transmission periods for the system information in the SFN sending period include resources for repeatedly sending the system information. Or, as shown in FIG. 11, only a part of transmission periods for the system information in the SFN sending period include resources for repeatedly sending the system information.

Step 503: the base station sends system information by virtue of a resource for repeatedly sending the system information corresponding to the highest coverage enhancement grade, or selects a resource for repeatedly sending the system information corresponding to a coverage enhancement grade to send the system information according to a coverage enhancement requirement of a local cell.

The system information sent on the resource for repeatedly sending the system information is one of four system information coded blocks sent on a broadcast channel in the transmission period for the system information. The coded blocks corresponding to the system information repeatedly sent in a radio frame are the same, or the coded blocks are selected to be repeatedly transmitted according to a pre-defined sequence, for example, according to a sequence of coded block 1, coded block 2, coded block 3 and coded block 4 or a sequence of coded block 1, coded block 3, coded block 2 and coded block 4.

Figure 6:
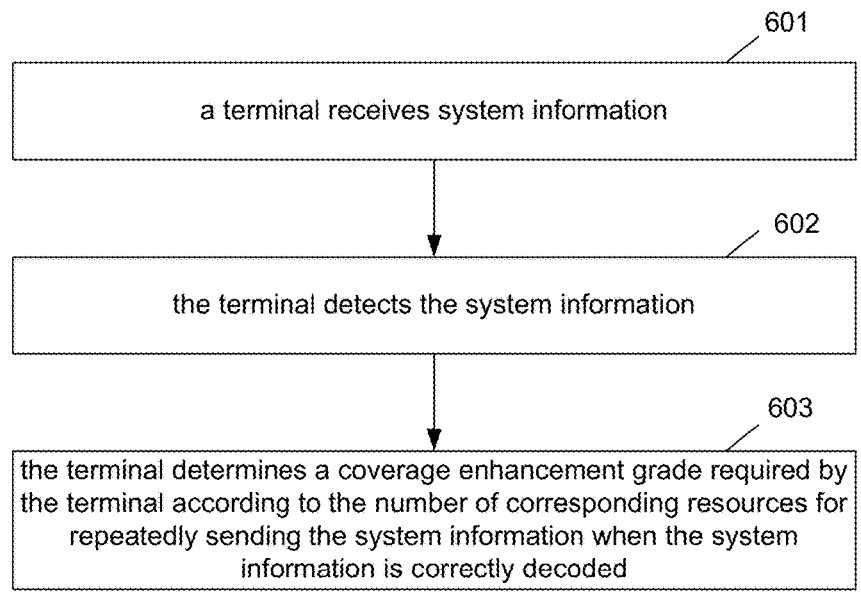
FIG. 6 is a second flowchart of a method for transmitting system information at a terminal side according to an embodiment of the disclosure.

As shown in FIG. 6, processing steps at a terminal side include the following steps.

Step 601: a terminal receives the system information.

Step 602: the terminal detects the system information.

The system information is system information sent on the broadcast channel and system information sent on a resource for repeatedly sending the system information.

Step 603: the terminal determines a coverage enhancement grade required by the terminal according to the number of corresponding resources for repeatedly sending the system information when the system information is correctly decoded.

Figure 1:
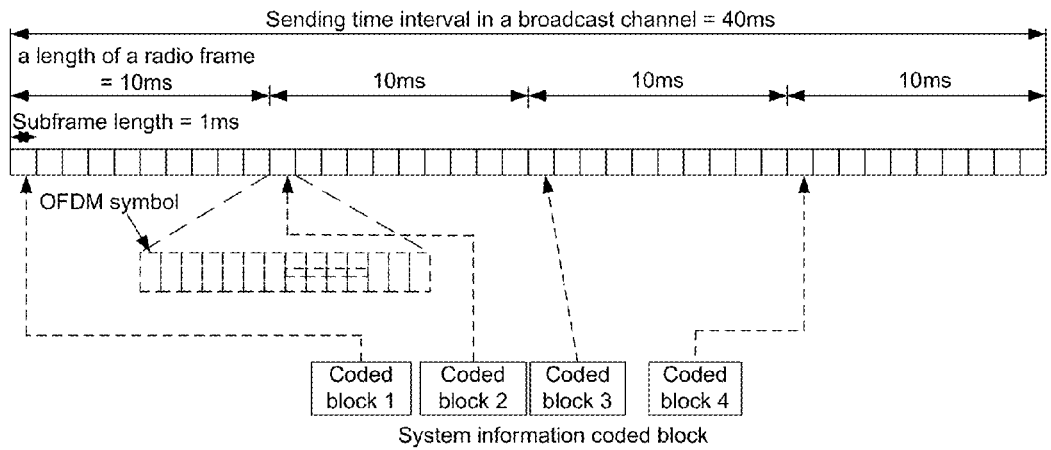
FIG. 1 is a scheduling diagram for an MIB message in an existing LTE system.

The terminal decodes the system information sent on the broadcast channel shown in FIG. 1, and determines that the coverage enhancement grade of the terminal is not required for coverage enhancement if succeeding in decoding; if failing in decoding, the terminal combines and decodes data received on the broadcast channel and data received on the resource for repeatedly sending the system information corresponding to coverage enhancement grade 1 shown in FIG. 7(a), and if succeeding in decoding, the terminal determines that the coverage enhancement grade of the terminal is "coverage enhancement grade 1"; if failing in decoding, the terminal combines and decodes the data received on the broadcast channel and data received on the resource for repeatedly sending the system information corresponding to coverage enhancement grade 2 shown in FIG. 7(b), and if succeeding in decoding, the terminal determines that the coverage enhancement grade of the terminal is "coverage enhancement grade 2"; and if failing in decoding, the terminal combines and decodes the data received on the broadcast channel and data received on the resource for repeatedly sending the system information corresponding to coverage enhancement grade 3 shown in FIG. 7(c).

According to the embodiment, the sending resources of the system information may be flexibly configured according to a network deployment of an operating company, and terminal equipment may also acquire the coverage enhancement grade required by the terminal by an adaptive detection method to ensure that the terminal equipment normally accesses a network for the required coverage enhancement grade by adopting a corresponding coverage enhancement means.

Embodiment 3

The embodiment describes and illustrates system information transmission implemented by adopting a method for transmitting system information provided by the disclosure in an FDD system in detail.

Specific processing steps at a base station side include the following steps.

Step 501: positions of resources for repeatedly sending the system information corresponding to different coverage enhancement grades in a transmission period for the system information are determined according to repeated transmission times.

Herein, the transmission period for the system information includes four radio frames. A resource for repeatedly sending the system information corresponding to a high coverage enhancement grade includes a resource for repeatedly sending the system information corresponding to a low coverage enhancement grade, wherein the high coverage enhancement grade corresponds to large repetition times, and the low coverage enhancement grade corresponds to small repetition times. In the embodiment, allocation of resources for repeatedly sending the system information corresponding to multiple coverage enhancement grades is shown in FIG. 5. In the embodiment, there are totally four coverage enhancement grades, the repeated transmission times is a multiple of four, and the repeated transmission times corresponding to coverage enhancement grades 1, 2, 3 and 4 are sequentially 4, 12, 24 and 36. The resource for repeatedly sending the system information corresponding to coverage enhancement grade 1 is shown in FIG. 8(*a*), and the resource for repeatedly sending the system information corresponding to coverage enhancement grade 2 includes the resource for repeatedly sending the system information corresponding to coverage enhancement grade 1, as shown in FIG. 8(*b*); the resource for repeatedly sending the system information corresponding to coverage enhancement grade 3 includes the resource for repeatedly sending the system information corresponding to coverage enhancement grade 2, as shown in FIG. 8(*c*); and the resource for repeatedly sending the system information corresponding to coverage enhancement grade 4 includes the resource for repeatedly sending the system information corresponding to coverage enhancement grade 3, as shown in FIG. 8(*d*). Subframes including the resource for repeatedly sending the system information are selected from a radio frame according to a principle that subframes of a second half and first half of the frame are selected sequentially alternately. An OFDM symbol position of the system information in each subframe is the same.

Step 502: a base station determines transmission periods for the system information including resources for repeatedly sending the system information in an SFN sending period.

The SFN sending period includes 1,024 radio frames. The SFN sending period includes 1,024 radio frames, and each transmission period for the system information includes four radio frames. As shown in FIG. 10, all the transmission periods for the system information in the SFN sending period include resources for repeatedly sending the system information. Or, as shown in FIG. 11, only a part of transmission periods for the system information in the SFN sending period include resources for repeatedly sending the system information.

Step 503: the base station sends system information by virtue of a resource for repeatedly sending the system information corresponding to the highest coverage enhancement grade, or selects a resource for repeatedly sending the system information corresponding to a coverage enhancement grade to send the system information according to a coverage enhancement requirement of a local cell.

The system information sent on the resource for repeatedly sending the system information is one of four system information coded blocks sent on a broadcast channel in the transmission period for the system information. The coded blocks corresponding to the system information repeatedly sent in a radio frame are the same, or the coded blocks are selected to be repeatedly transmitted according to a predefined sequence, for example, according to a sequence of coded block 1, coded block 2, coded block 3 and coded block 4 or a sequence of coded block 1, coded block 3, coded block 2 and coded block 4.

Processing steps at a terminal side include that: a terminal detects the system information; and the terminal determines a coverage enhancement grade required by the terminal according to the number of corresponding resources for repeatedly sending the system information when the system information is correctly decoded.

Herein, the system information is system information sent on the broadcast channel and system information sent on a resource for repeatedly sending the system information.

The terminal decodes the system information sent on the broadcast channel shown in FIG. 1, and if succeeding in decoding, the terminal determines that the coverage enhancement grade of the terminal is not required for coverage enhancement;

if failing in decoding, the terminal combines and decodes data received on the broadcast channel and data received on the resource for repeatedly sending the system information corresponding to coverage enhancement grade 1 shown in FIG. 8(*a*), and if succeeding in decoding, the terminal determines that the coverage enhancement grade of the terminal is "coverage enhancement grade 1";

if failing in decoding, the terminal combines and decodes the data received on the broadcast channel and data received on the resource for repeatedly sending the system information corresponding to coverage enhancement grade 2 shown in FIG. 8(*b*), and if succeeding in decoding, the terminal determines that the coverage enhancement grade of the terminal is "coverage enhancement grade 2";

if failing in decoding, the terminal combines and decodes the data received on the broadcast channel and data received on the resource for repeatedly sending the system information corresponding to coverage enhancement grade 3 shown in FIG. 8(*c*), and if succeeding in decoding, the terminal determines that the coverage enhancement grade of the terminal is "coverage enhancement grade 3"; and if failing in decoding, the terminal combines and decodes the data received on the broadcast channel and data received on the resource for repeatedly sending the system information corresponding to coverage enhancement grade 4 shown in FIG. 8(*d*).

According to the embodiment, the sending resources of the system information may be flexibly configured according to a network deployment of an operating company, and terminal equipment may also acquire the coverage enhancement grade required by the terminal by adaptive detection to ensure that the terminal equipment normally accesses a network for the required coverage enhancement grade by adopting a corresponding coverage enhancement means.

Embodiment 3

The embodiment describes and illustrates system information transmission implemented by adopting a method for transmitting system information provided by the disclosure in an FDD system in detail.

Specific processing steps at a base station side include the following steps.

Step 501: positions of resources for repeatedly sending the system information corresponding to different coverage enhancement grades in a transmission period for the system information are determined according to repeated transmission times.

Herein, the transmission period for the system information includes four radio frames. A resource for repeatedly sending the system information corresponding to a high coverage enhancement grade includes a resource for repeatedly sending the system information corresponding to a low coverage enhancement grade, wherein the high coverage enhancement grade corresponds to large repetition times, and the low coverage enhancement grade corresponds to small repetition times.

Figure 9A:
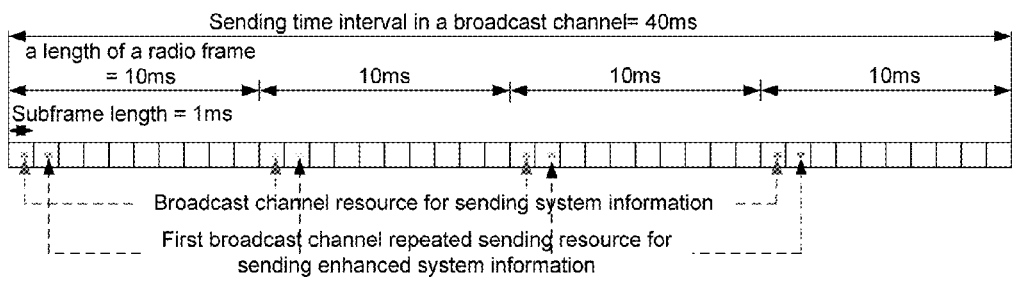
FIG. 9 is a third diagram of resources for repeatedly sending the system information corresponding to multiple coverage enhancement grades in a method for transmitting system information according to the disclosure.
Figure 9B:
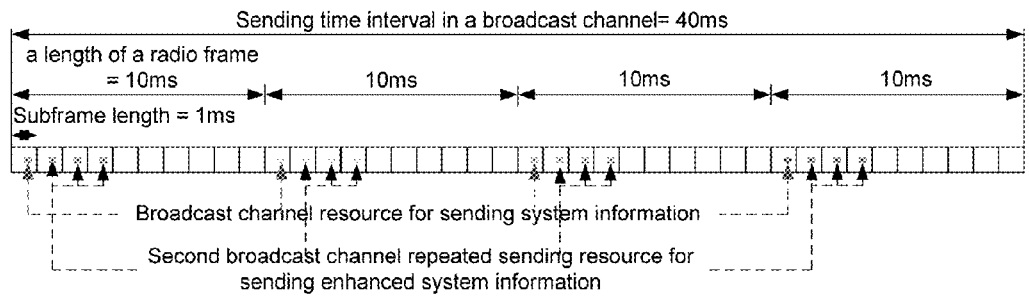
Figure 9C:
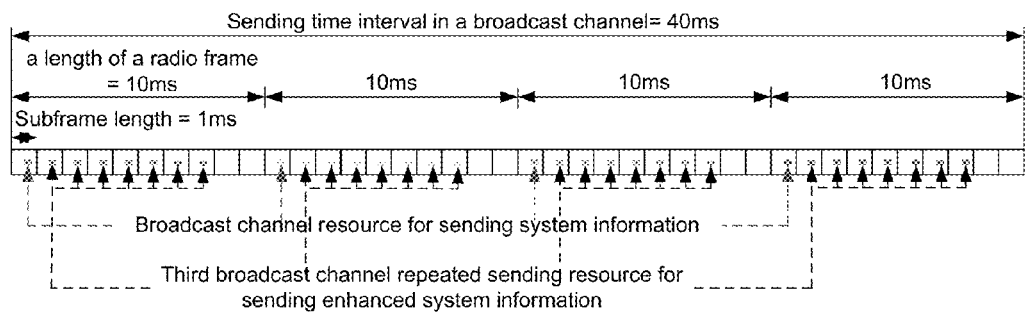
Figure 10A:
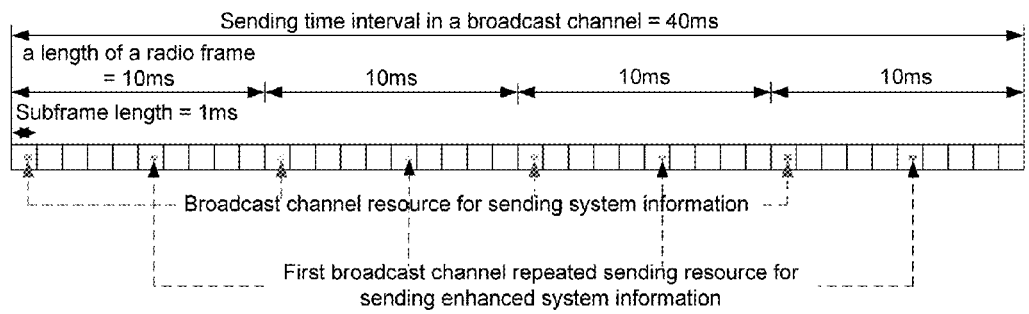
FIG. 10 is a fourth diagram of resources for repeatedly sending the system information corresponding to multiple coverage enhancement grades in a method for transmitting system information according to the disclosure.
Figure 10B:
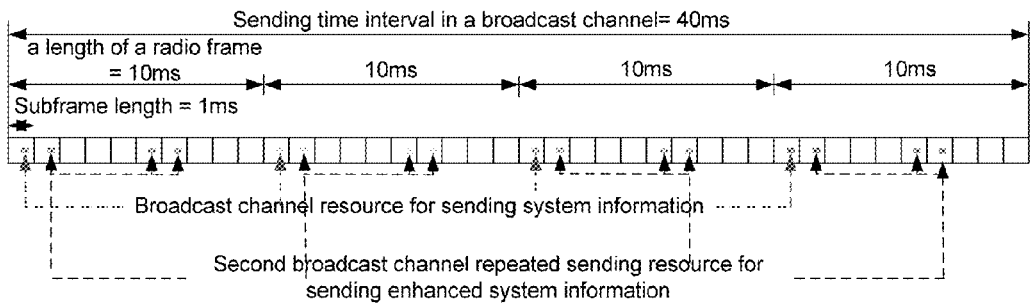
Figure 10C:
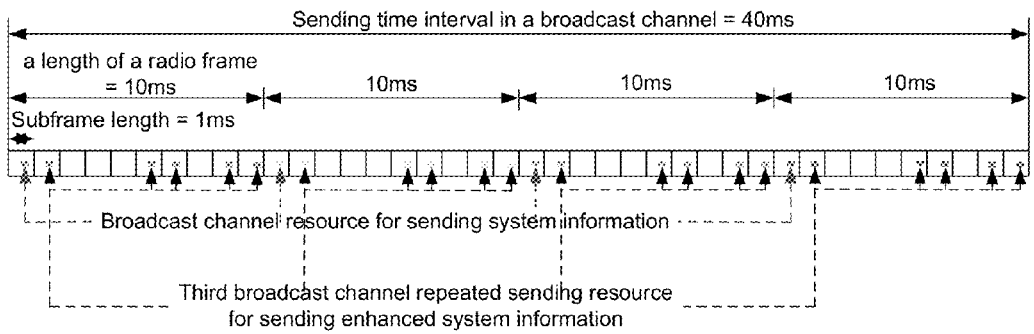
Figure 10D:
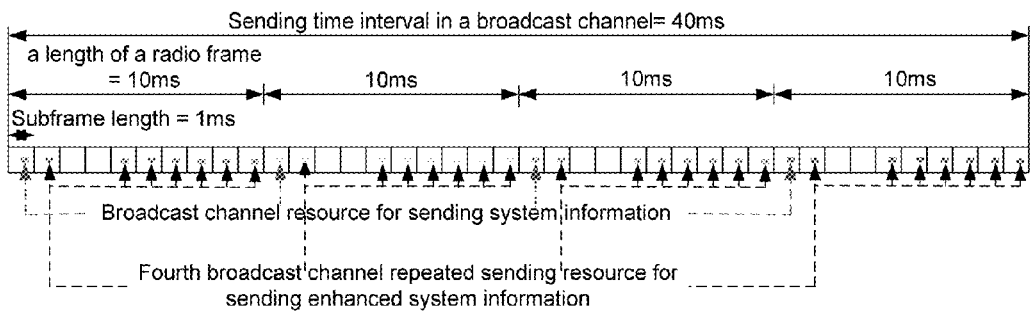
Figure 10E:
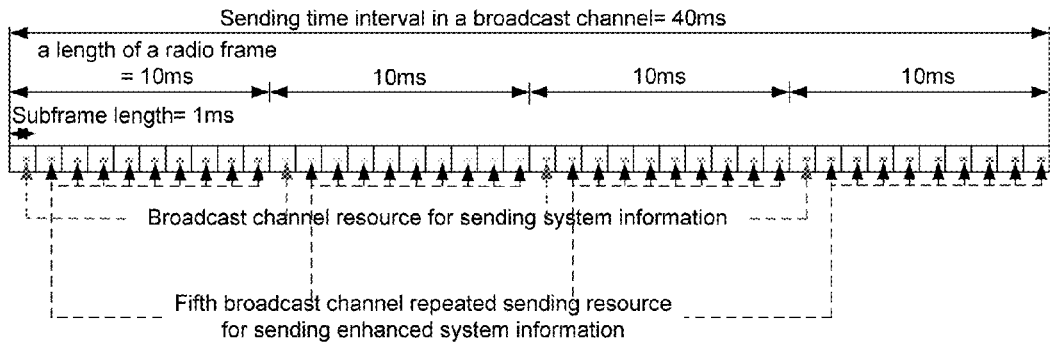

In the embodiment, allocation of resources for repeatedly sending the system information corresponding to multiple coverage enhancement grades is shown in FIG. 6. In the embodiment, there are totally three coverage enhancement grades, the repeated transmission times is a multiple of four, and the repeated transmission times corresponding to coverage enhancement grades 1, 2 and 3 are sequentially 4, 12 and 28. The resource for repeatedly sending the system information corresponding to coverage enhancement grade 1 is shown in FIG. 9(*a*), and the resource for repeatedly sending the system information corresponding to coverage enhancement grade 2 includes the resource for repeatedly sending the system information corresponding to coverage enhancement grade 1, as shown in FIG. 9(*b*); and the resource for repeatedly sending the system information corresponding to coverage enhancement grade 3 includes the resource for repeatedly sending the system information corresponding to coverage enhancement grade 2, as shown in FIG. 9(*c*). Subframes including the resources for repeatedly sending the system information are selected from a radio frame according to a principle that subframes of a first half of the frame are preferably selected. An OFDM symbol position of the system information in each subframe is the same.

Step 502: a base station determines transmission periods for the system information including resources for repeatedly sending the system information in an SFN sending period.

Figure 13:
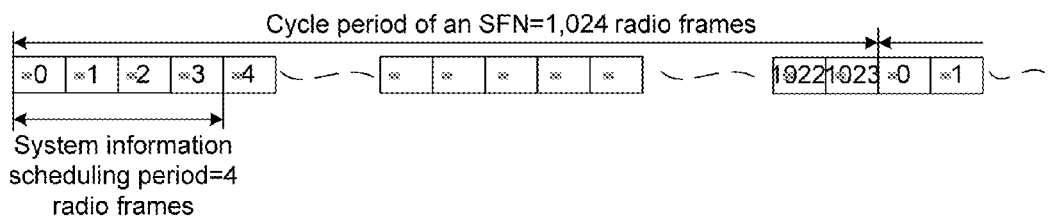
FIG. 13 is a first distribution diagram of resources for repeatedly sending the system information in an SFN sending period according to a method for transmitting system information according to the disclosure.
Figure 14:
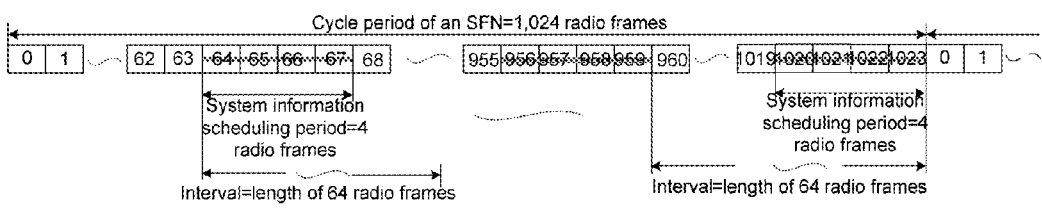
FIG. 14 is a second distribution diagram of resources for repeatedly sending the system information in an SFN sending period according to a method for transmitting system information according to the disclosure.

The SFN sending period includes 1,024 radio frames, and each transmission period for the system information includes four radio frames. As shown in FIG. 13, all the transmission periods for the system information in the SFN sending period include resources for repeatedly sending the system information. Or, as shown in FIG. 14, only a part of transmission periods for the system information in the SFN sending period include resources for repeatedly sending the system information.

Step 503: the base station sends system information by virtue of a resource for repeatedly sending the system information corresponding to the highest coverage enhancement grade, or selects a resource for repeatedly sending the system information corresponding to a coverage enhancement grade to send the system information according to a coverage enhancement requirement of a local cell.

The system information sent on the resource for repeatedly sending the system information is one of four system information coded blocks sent on a broadcast channel in the transmission period for the system information. The coded blocks corresponding to the system information repeatedly sent in a radio frame are the same, or the coded blocks are selected to be repeatedly transmitted according to a predefined sequence, for example, according to a sequence of coded block 1, coded block 2, coded block 3 and coded block 4 or a sequence of coded block 1, coded block 3, coded block 2 and coded block 4.

Processing steps at a terminal side include that:

a terminal detects the system information, wherein the system information is system information sent on the broadcast channel and system information sent on a resource for repeatedly sending the system information; and the terminal determines a coverage enhancement grade required by the terminal according to the number of corresponding resources for repeatedly sending the system information when the system information is correctly decoded.

The terminal decodes the system information sent on the broadcast channel shown in FIG. 1, and if succeeding in decoding, the terminal determines that the coverage enhancement grade of the terminal is not required for coverage enhancement;

if failing in decoding, the terminal combines and decodes data received on the broadcast channel and data received on the resource for repeatedly sending the system information corresponding to coverage enhancement grade 1 shown in FIG. 9(*a*), and if succeeding in decoding, the terminal determines that the coverage enhancement grade of the terminal is "coverage enhancement grade 1";

if failing in decoding, the terminal combines and decodes the data received on the broadcast channel and data received on the resource for repeatedly sending the system information corresponding to coverage enhancement grade 2 shown in FIG. 9(*b*), and if succeeding in decoding, the terminal determines that the coverage enhancement grade of the terminal is "coverage enhancement grade 2"; and if failing in decoding, the terminal combines and decodes the data received on the broadcast channel and data received on the resource for repeatedly sending the system information corresponding to coverage enhancement grade 3 shown in FIG. 9(*c*).

According to the embodiment, the sending resources of the system information may be flexibly configured according to a network deployment of an operating company, and terminal equipment may also acquire the coverage enhancement grade required by the terminal by adaptive detection to ensure that the terminal equipment normally accesses a network for the required coverage enhancement grade by adopting a corresponding coverage enhancement means.

Embodiment 4

The embodiment describes and illustrates system information transmission implemented by adopting a method for transmitting system information provided by the disclosure in an FDD system in detail.

Specific processing steps at a base station side include the following steps.

Step 501: positions of resources for repeatedly sending the system information corresponding to different coverage enhancement grades in a transmission period for the system information are determined according to repeated transmission times.

Herein, the transmission period for the system information includes four radio frames. A resource for repeatedly sending the system information corresponding to a high coverage enhancement grade includes a resource for repeatedly sending the system information corresponding to a low coverage enhancement grade, wherein the high coverage enhancement grade corresponds to large repetition times, and the low coverage enhancement grade corresponds to small repetition times.

In the embodiment, allocation of resources for repeatedly sending the system information corresponding to multiple coverage enhancement grades is shown in FIG. 7. In the embodiment, there are totally five coverage enhancement grades, the repeated transmission times is a multiple of four, and the repeated transmission times corresponding to coverage enhancement grades 1, 2, 3, 4 and 5 are sequentially 4, 12, 20, 28 and 36. The resource for repeatedly sending the system information corresponding to coverage enhancement grade 1 is shown in FIG. 10(*a*), and the resource for repeatedly sending the system information corresponding to coverage enhancement grade 2 includes the resource for repeatedly sending the system information corresponding to coverage enhancement grade 1, as shown in FIG. 10(*b*); the resource for repeatedly sending the system information corresponding to coverage enhancement grade 3 includes the resource for repeatedly sending the system information corresponding to coverage enhancement grade 2, as shown in FIG. 10(*c*); the resource for repeatedly sending the system information corresponding to coverage enhancement grade 4 includes the resource for repeatedly sending the system information corresponding to coverage enhancement grade 3, as shown in FIG. 10(*d*); and the resource for repeatedly sending the system information corresponding to coverage enhancement grade 5 includes the resource for repeatedly sending the system information corresponding to coverage enhancement grade 4, as shown in FIG. 10(*e*). Subframes including the resources for repeatedly sending the system information are selected from a radio frame according to a predefined subframe priority sequence. The predefined subframe priority sequence specifically includes: subframe priorities are 5, 9, 4, 8, 3, 7, 2, 6, 1; or 5, 9, 4, 8, 3, 7, 6, 1, 2; or 5, 9, 4, 8, 3, 6, 1, 7, 2; or 5, 9, 4, 6, 1, 8, 3, 7, 2; or 5, 9, 8, 7, 6, 1, 4, 3, 2; or 5, 6, 1, 9, 4, 8, 3, 7, 2; or 5, 6, 1, 9, 8, 7, 4, 3, 2. During specific selection, if the number of subframes required to include the resource for repeatedly sending the system information for maximum repetition times is smaller than the total number of selectable subframes, the subframes may be sequentially extracted according to the subframe priority sequence (for example, if there are four subframes required to include the resource for repeatedly sending the system information for the maximum repeated transmission times, subframes 5, 1, 8 and 4 may be sequentially extracted and selected according to the predefined subframe priority sequence 5, 6, 1, 9, 8, 7, 4, 3, 2). The predefined subframe priority sequence in the embodiment is 5, 6, 1, 9, 8, 7, 4, 3, 2. An OFDM symbol position of the system information in each subframe is the same.

Step 502: a base station determines transmission periods for the system information including resources for repeatedly sending the system information in an SFN sending period.

The SFN sending period includes 1,024 radio frames, and each transmission period for the system information includes four radio frames. As shown in FIG. 13, all the transmission periods for the system information in the SFN sending period include resources for repeatedly sending the system information. Or, as shown in FIG. 14, only a part of transmission periods for the system information in the SFN sending period include resources for repeatedly sending the system information.

Step 503: the base station sends system information by virtue of a resource for repeatedly sending the system information corresponding to the highest coverage enhancement grade, or selects a resource for repeatedly sending the system information corresponding to a coverage enhancement grade to send the system information according to a coverage enhancement requirement of a local cell.

The system information sent on the resource for repeatedly sending the system information is one of four system information coded blocks sent on a broadcast channel in the transmission period for the system information. The coded blocks corresponding to the system information repeatedly sent in a radio frame are the same, or the coded blocks are selected to be repeatedly transmitted according to a predefined sequence, for example, according to a sequence of coded block 1, coded block 2, coded block 3 and coded block 4 or a sequence of coded block 1, coded block 3, coded block 2 and coded block 4.

Processing steps at a terminal side include that:

a terminal detects the system information, wherein the system information is system information sent on the broadcast channel and system information sent on a resource for repeatedly sending the system information; and the terminal determines a coverage enhancement grade required by the terminal according to the number of corresponding resources for repeatedly sending the system information when the system information is correctly decoded.

The terminal decodes the system information sent on the broadcast channel shown in FIG. 1, and if succeeding in decoding, the terminal determines that the coverage enhancement grade of the terminal is not required for coverage enhancement;

if failing in decoding, the terminal combines and decodes data received on the broadcast channel and data received on the resource for repeatedly sending the system information corresponding to coverage enhancement grade 1 shown in FIG. 10(*a*), and if succeeding in decoding, the terminal determines that the coverage enhancement grade of the terminal is "coverage enhancement grade 1";

if failing in decoding, the terminal combines and decodes the data received on the broadcast channel and data received on the resource for repeatedly sending the system information corresponding to coverage enhancement grade 2 shown in FIG. 10(*b*), and if succeeding in decoding, the terminal determines that the coverage enhancement grade of the terminal is "coverage enhancement grade 2";

if failing in decoding, the terminal combines and decodes the data received on the broadcast channel and data received on the resource for repeatedly sending the system information corresponding to coverage enhancement grade 3 shown in FIG. 10(*c*), and if succeeding in decoding, the terminal determines that the coverage enhancement grade of the terminal is "coverage enhancement grade 3";

if failing in decoding, the terminal combines and decodes the data received on the broadcast channel and data received on the resource for repeatedly sending the system information corresponding to coverage enhancement grade 4 shown in FIG. 10(*d*), and if succeeding in decoding, the terminal determines that the coverage enhancement grade of the terminal is "coverage enhancement grade 4"; and if failing in decoding, the terminal combines and decodes the data received on the broadcast channel and data received on the resource for repeatedly sending the system information corresponding to coverage enhancement grade 3 shown in FIG. 10(*e*).

According to the embodiment, the sending resources of the system information may be flexibly configured according to a network deployment of an operating company, and terminal equipment may also acquire the coverage enhancement grade required by the terminal by adaptive detection to ensure that the terminal equipment normally accesses a network for the required coverage enhancement grade by adopting a corresponding coverage enhancement means.

Embodiment 5

The embodiment describes and illustrates system information transmission implemented by adopting a method for transmitting system information provided by the disclosure in an FDD or Time Division Duplexing (TDD) system in detail (the embodiment makes description mainly for the TDD system with an uplink and downlink subframe configuration 2).

Specific processing steps at a base station side include:

Step 501: positions of resources for repeatedly sending the system information corresponding to different coverage enhancement grades in a transmission period for the system information are determined according to repeated transmission times.

Herein, the transmission period for the system information includes four radio frames. A resource for repeatedly sending the system information corresponding to a high coverage enhancement grade includes a resource for repeatedly sending the system information corresponding to a low coverage enhancement grade, wherein the high coverage enhancement grade corresponds to large repetition times, and the low coverage enhancement grade corresponds to small repetition times. In the embodiment, allocation of resources for repeatedly sending the system information corresponding to multiple coverage enhancement grades is shown in FIG. 8. In the embodiment, there are totally three coverage enhancement grades, the repeated transmission times is a multiple of four, and the repeated transmission times corresponding to coverage enhancement grades 1, 2 and 3 are sequentially 4, 12 and 36. The resource for repeatedly sending the system information corresponding to coverage enhancement grade 1 is shown in FIG. 11(*a*), and the resource for repeatedly sending the system information corresponding to coverage enhancement grade 2 includes the resource for repeatedly sending the system information corresponding to coverage enhancement grade 1, as shown in FIG. 11(*b*); and the resource for repeatedly sending the system information corresponding to coverage enhancement grade 3 includes the resource for repeatedly sending the system information corresponding to coverage enhancement grade 2, as shown in FIG. 11(*c*). When a subframe of a transmission period for the system information is required to include more than one resource for repeatedly sending the system information, selection of the resource for repeatedly sending the system information may be implemented in one of manners as follows: intra-subframe selection is performed, and then inter-subframe selection is performed (repeated transmission times of one subframe is predefined, and after one subframe is full of mapped system information, mapping to the next subframe is implemented), or inter-subframe selection is performed, and then intra-subframe selection is performed (as shown in FIG. 8, five subframes in a radio frame are defined to be available for repeated transmission, and when repeated transmission times exceeds 5, repeated transmission is performed in the same subframes). Subframes including the resources for repeatedly sending the system information are selected from a radio frame according to a predefined subframe priority sequence; and a part of predefined priorities may be selected for maximum repetition times. When a subframe of the radio frame includes only one resource for repeatedly sending the system information, the predefined subframe priority sequence specifically includes: subframe priorities are 5, 9, 4, 8, 3, 7, 2, 6, 1; or 5, 9, 4, 8, 3, 7, 6, 1, 2; or 5, 9, 4, 8, 3, 6, 1, 7, 2; or 5, 9, 4, 6, 1, 8, 3, 7, 2; or 5, 9, 8, 7, 6, 1, 4, 3, 2; or 5, 6, 1, 9, 4, 8, 3, 7, 2; or 5, 6, 1, 9, 8, 7, 4, 3, 2.

When a subframe of the radio frame includes multiple resources for repeatedly sending the system information (each resource for repeatedly sending the system information occupies four OFDM symbols on the time domain and occupies 72 subcarriers on the frequency domain), the predefined subframe priority sequence specifically includes: subframe priorities are 0, 5, 9, 4, 8, 3; or 0, 5, 9, 4, 6, 1; or 0, 5, 9, 8, 7, 6; or 0, 5, 6, 1, 9, 4; or 5, 6, 1, 9, 8, wherein priorities 0 and 5 may be exchanged. OFDM symbol positions of the system information in subframes with the same subframe type are the same based on the classification of subframe types; and the classification of subframe types includes: subframe 0 and subframe 5 have one type, and the other subframes have the other type; or, subframe 0 and subframe 5 have one type, subframe 1 and subframe 6 have the other type, and the other subframes have another type; or, subframe 0 and subframe 5 have one type, subframe 1 has the other type, subframe 6 has another type, and the other subframes have yet another type; or, subframe 0 and subframe 5 have one type, subframe 1 has the other type, and the other subframes have another type. The system information is mapped to frequency-domain positions of the repeated sending resource in the other subframes or the same subframe according to an original system information sending frequency-domain position in subframe 0, a surplus subcarrier is idle if existing, and if a system information mapping position on a certain resource unit conflicts with the reference signal and the like, sending of the system information at the position is cancelled.

Step 502: a base station determines transmission periods for the system information including resources for repeatedly sending the system information in an SFN sending period.

The SFN sending period includes 1,024 radio frames, and each transmission period for the system information includes four radio frames. As shown in FIG. 10, all the transmission periods for the system information in the SFN sending period include resources for repeatedly sending the system information. Or, as shown in FIG. 11, only a part of transmission periods for the system information in the SFN sending period include resources for repeatedly sending the system information.

Step 503: the base station sends system information by virtue of a resource for repeatedly sending the system information corresponding to the highest coverage enhancement grade, or selects a resource for repeatedly sending the system information corresponding to a coverage enhancement grade to send the system information according to a coverage enhancement requirement of a local cell.

The system information sent on the resource for repeatedly sending the system information is one of four system information coded blocks sent on a broadcast channel in the transmission period for the system information. The coded blocks corresponding to the system information repeatedly sent in a radio frame are the same, or the coded blocks are selected to be repeatedly transmitted according to a predefined sequence, for example, according to a sequence of coded block 1, coded block 2, coded block 3 and coded block 4 or a sequence of coded block 1, coded block 3, coded block 2 and coded block 4.

Processing steps at a terminal side include that:

a terminal detects the system information, wherein the system information is system information sent on the broadcast channel and system information sent on a resource for repeatedly sending the system information; and the terminal determines a coverage enhancement grade required by the terminal according to the number of corresponding resources for repeatedly sending the system information when the system information is correctly decoded.

Figure 11C:
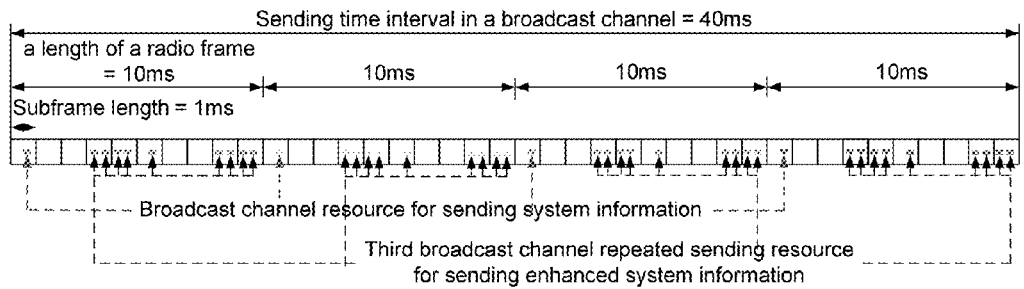

The terminal decodes the system information sent on the broadcast channel shown in FIG. 1, and if succeeding in decoding, the terminal determines that the coverage enhancement grade of the terminal is not required for coverage enhancement; if failing in decoding, the terminal combines and decodes data received on the broadcast channel and data received on the resource for repeatedly sending the system information corresponding to coverage enhancement grade 1 shown in FIG. 11(*a*), and if succeeding in decoding, the terminal determines that the coverage enhancement grade of the terminal is "coverage enhancement grade 1"; if failing in decoding, the terminal combines and decodes the data received on the broadcast channel and data received on the resource for repeatedly sending the system information corresponding to coverage enhancement grade 2 shown in FIG. 11(*b*), and if succeeding in decoding, the terminal determines that the coverage enhancement grade of the terminal is "coverage enhancement grade 2"; and if failing in decoding, the terminal combines and decodes the data received on the broadcast channel and data received on the resource for repeatedly sending the system information corresponding to coverage enhancement grade 3 shown in FIG. 11(c).

According to the embodiment, the sending resources of the system information may be flexibly configured according to a network deployment of an operating company, and in consideration of a mapping condition of available downlink subframes in different proportions in the TDD system, adoption of the same positions for mapping in the FDD and TDD systems may be ensured as much as possible to reduce influence on general data transmission; and terminal equipment may also acquire the coverage enhancement grade required by the terminal by adaptive detection to ensure that the terminal equipment normally accesses a network for the required coverage enhancement grade by adopting a corresponding coverage enhancement means.

Embodiment 6

The embodiment describes and illustrates system information transmission implemented by adopting a method for transmitting system information provided by the disclosure in an FDD or TDD system in detail (the embodiment makes description mainly for the TDD system with an uplink and downlink subframe configuration 1).

Specific processing steps at a base station side include the following steps.

Step 501: positions of resources for repeatedly sending the system information corresponding to different coverage enhancement grades in a transmission period for the system information are determined according to repeated transmission times.

Wherein, the transmission period for the system information includes four radio frames. A resource for repeatedly sending the system information corresponding to a high coverage enhancement grade includes a resource for repeatedly sending the system information corresponding to a low coverage enhancement grade, wherein the high coverage enhancement grade corresponds to large repetition times, and the low coverage enhancement grade corresponds to small repetition times. In the embodiment, allocation of resources for repeatedly sending the system information corresponding to multiple coverage enhancement grades is shown in FIG. 9. In the embodiment, there are totally five coverage enhancement grades, the repeated transmission times is a multiple of four, and the repeated transmission times corresponding to coverage enhancement grades 1, 2, 3, 4 and 5 are sequentially 4, 12, 20, 28 and 36. The resource for repeatedly sending the system information corresponding to coverage enhancement grade 1 is shown in FIG. 12(*a*), and the resource for repeatedly sending the system information corresponding to coverage enhancement grade 2 includes the resource for repeatedly sending the system information corresponding to coverage enhancement grade 1, as shown in FIG. 12(*b*); the resource for repeatedly sending the system information corresponding to coverage enhancement grade 3 includes the resource for repeatedly sending the system information corresponding to coverage enhancement grade 2, as shown in FIG. 12(*c*); the resource for repeatedly sending the system information corresponding to coverage enhancement grade 4 includes the resource for repeatedly sending the system information corresponding to coverage enhancement grade 3, as shown in FIG. 12(*d*); and the resource for repeatedly sending the system information corresponding to coverage enhancement grade 5 includes the resource for repeatedly sending the system information corresponding to coverage enhancement grade 4, as shown in FIG. 12(*e*). When a subframe of a transmission period for the system information is required to include multiple resources for repeatedly sending the system information (each resource for repeatedly sending the system information occupies four OFDM symbols on the time domain and occupies 72 subcarriers on the frequency domain), selection of the resource for repeatedly sending the system information may be implemented in one of manners as follows: repeated transmission times of one subframe is predefined, and after one subframe is full of mapped system information, mapping to the next subframe is implemented (as shown in FIG. 12, system information repeated transmission times of a subframe is predefined to be 2 in the embodiment), or inter-subframe selection is performed, and then intra-subframe selection is performed. Subframes including the resources for repeatedly sending the system information are selected from a radio frame according to a predefined subframe priority sequence, and the predefined subframe priority sequence specifically includes: subframe priorities are 0, 5, 9, 4, 8, 3; or 0, 5, 9, 4, 6, 1; or 0, 5, 9, 8, 7, 6; or 0, 5, 6, 1, 9, 4; or 0, 5, 6, 1, 9, 8, wherein priorities 0 and 5 may be exchanged; and in the embodiment, the adopted subframe priorities are 5, 0, 9, 4, 6, 1. An OFDM symbol position of the system information in each subframe is the same, or, the OFDM symbol positions in the subframes with the same type are the same according to the classification of subframe types; and the classification of subframe types includes: subframe 0 and subframe 5 have one type, and the other subframes have the other type; or, subframe 0 and subframe 5 have one type, subframe 1 and subframe 6 have the othertype, and the other subframes have another type; or, subframe 0 and subframe 5 have one type, subframe 1 has the other type, subframe 6 has another type, and the other subframes have yet another type; or, subframe 0 and subframe 5 have one type, subframe 1 has the other type, and the other subframes have another type. In the embodiment, subframe 0 and subframe 5 have one type, subframe 1 and subframe 6 have the other type and subframe 4 and subframe 9 have another type. The system information is mapped to frequency-domain positions of the repeated sending resource in the other subframes or the same subframe according to an original system information sending frequency-domain position in subframe 0, a surplus subcarrier is idle if any, and if a system information mapping position on a certain resource unit conflicts with a reference signal and the like, sending of the system information at the position is cancelled.

Step 502: a base station determines transmission periods for the system information including resources for repeatedly sending the system information in an SFN sending period.

The SFN sending period includes 1,024 radio frames, and each transmission period for the system information includes four radio frames. As shown in FIG. 13, all the transmission periods for the system information in the SFN sending period include resources for repeatedly sending the system information. Or, as shown in FIG. 14, only a part of transmission periods for the system information in the SFN sending period include resources for repeatedly sending the system information.

Step 503: the base station sends system information by virtue of a resource for repeatedly sending the system information corresponding to the highest coverage enhancement grade, or selects a resource for repeatedly sending the system information corresponding to a coverage enhancement grade to send the system information according to a coverage enhancement requirement of a local cell.

The system information sent on the resource for repeatedly sending the system information is one of four system information coded blocks sent on a broadcast channel in the transmission period for the system information. The coded blocks corresponding to the system information repeatedly sent in a radio frame are the same, or the coded blocks are selected to be repeatedly transmitted according to a predefined sequence, for example, according to a sequence of coded block 1, coded block 2, coded block 3 and coded block 4 or a sequence of coded block 1, coded block 3, coded block 2 and coded block 4.

Processing steps at a terminal side include that:

a terminal detects the system information, wherein the system information is system information sent on the broadcast channel and system information sent on a resource for repeatedly sending the system information; and the terminal determines a coverage enhancement grade required by the terminal according to the number of corresponding resources for repeatedly sending the system information when the system information is correctly decoded.

Figure 12A:
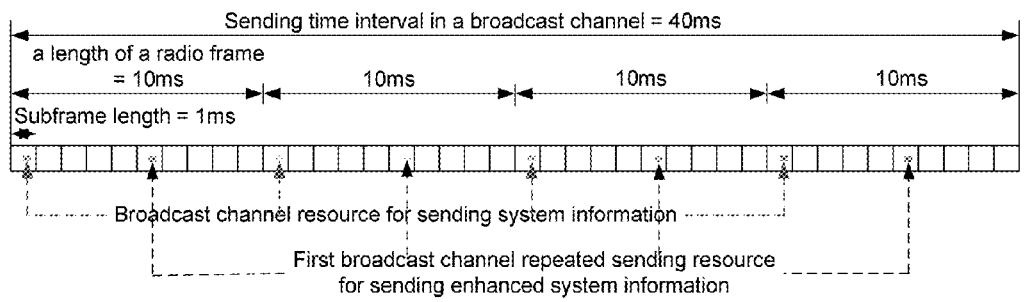
FIG. 12 is a sixth diagram of resources for repeatedly sending the system information corresponding to multiple coverage enhancement grades in a method for transmitting system information according to the disclosure.
Figure 12B:
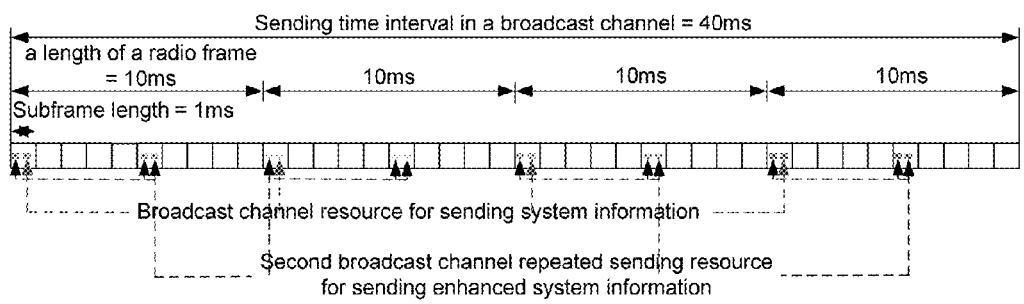
Figure 12C:
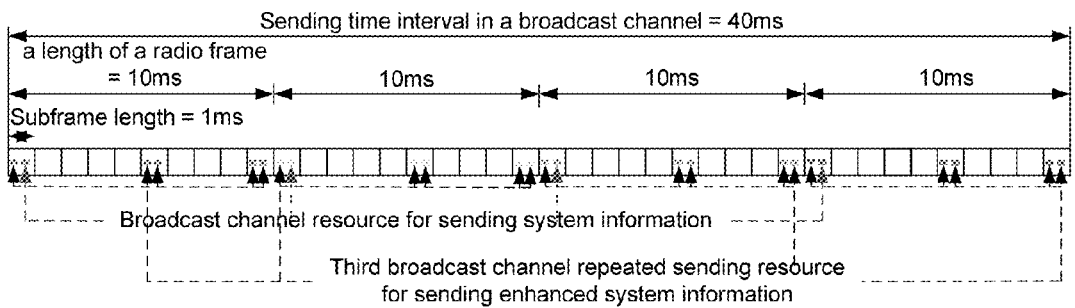
Figure 12D:
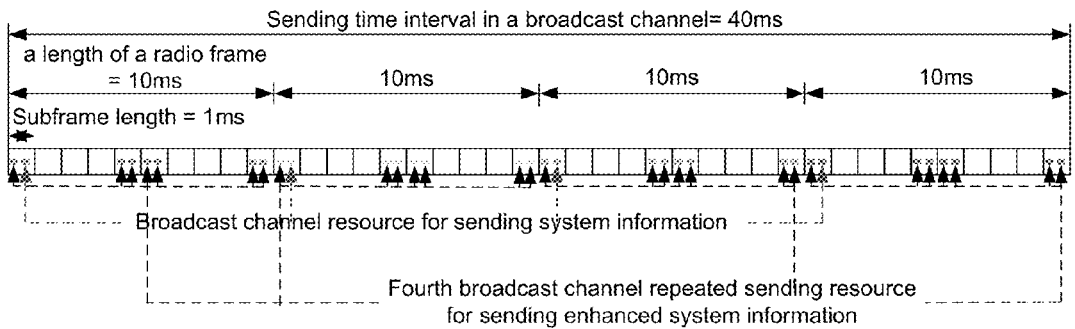
Figure 12E:
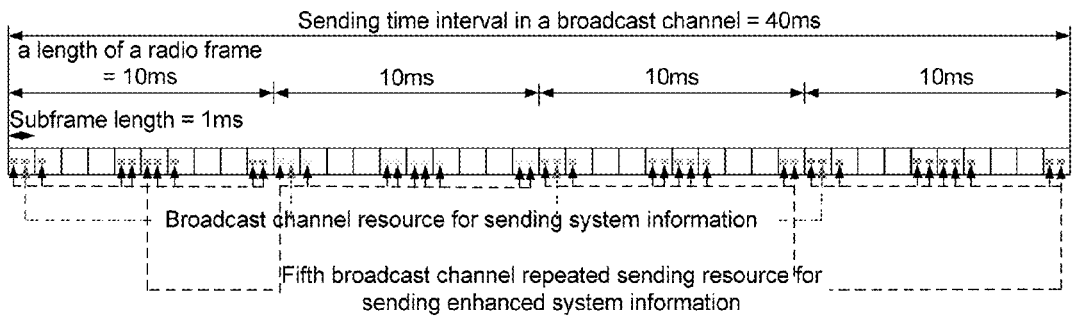

The terminal decodes the system information sent on the broadcast channel shown in FIG. 1, and if succeeding in decoding, the terminal determines that the coverage enhancement grade of the terminal is not required for coverage enhancement; if failing in decoding, the terminal combines and decodes data received on the broadcast channel and data received on the resource for repeatedly sending the system information corresponding to coverage enhancement grade 1 shown in FIG. 12(a), and if succeeding in decoding, the terminal determines that the coverage enhancement grade of the terminal is "coverage enhancement grade 1"; if failing in decoding, the terminal combines and decodes the data received on the broadcast channel and data received on the resource for repeatedly sending the system information corresponding to coverage enhancement grade 2 shown in FIG. 12(b), and if succeeding in decoding, the terminal determines that the coverage enhancement grade of the terminal is "coverage enhancement grade 2"; if failing in decoding, the terminal combines and decodes the data received on the broadcast channel and data received on the resource for repeatedly sending the system information corresponding to coverage enhancement grade 3 shown in FIG. 12(c), and if succeeding in decoding, the terminal determines that the coverage enhancement grade of the terminal is "coverage enhancement grade 3"; if failing in decoding, the terminal combines and decodes the data received on the broadcast channel and data received on the resource for repeatedly sending the system information corresponding to coverage enhancement grade 4 shown in FIG. 12(d), and if succeeding in decoding, the terminal determines that the coverage enhancement grade of the terminal is "coverage enhancement grade 4"; and if failing in decoding, the terminal combines and decodes the data received on the broadcast channel and data received on the resource for repeatedly sending the system information corresponding to coverage enhancement grade 5 shown in FIG. 12(e).

According to the embodiment, the sending resources of the system information may be flexibly configured according to a network deployment of an operating company, and in consideration of a mapping condition of available downlink subframes in different proportions in the TDD system, particularly a condition of a TDD special subframe, adoption of the same positions for mapping in the FDD and TDD systems may be ensured as much as possible to reduce influence on general data transmission; and terminal equipment may also acquire the coverage enhancement grade required by the terminal by adaptive detection to ensure that the terminal equipment normally accesses a network for the required coverage enhancement grade by adopting a corresponding coverage enhancement means.

The above is only the preferred embodiments of the disclosure and not intended to limit the scope of protection of the disclosure.

What is claimed is:

1. A method for transmitting system information, comprising:

determining a position of a resource for repeatedly sending the system information in a transmission period for the system information according to repeated transmission times for repeatedly sending the system information; and sending the system information on the resource for repeatedly sending the system information, wherein the position of the resource for repeatedly sending the system information in the transmission period for the system information is characterized in that:

a resource for repeatedly sending the system information corresponding to a high coverage enhancement grade comprises a resource for repeatedly sending the system information corresponding to a low coverage enhancement grade, wherein the coverage enhancement grades comprise one or more preset grades, and the coverage enhancement grades respectively correspond to different system information repeated transmission times; and wherein system information repeated transmission times corresponding to the high coverage enhancement grade is bigger than system information repeated transmission times corresponding to the low coverage enhancement grade.

2. The method according to claim 1, wherein the transmission period for the system information comprises four radio frames; and the resource for repeatedly sending the system information is one scheduled in each transmission period for the system information or part of transmission periods for the system information of each System Frame Number (SFN) sending period.

3. The method according to claim 1, wherein the step of sending the system information on the resource for repeatedly sending the system information comprises:

sending, by a base station, the system information according to a resource for repeatedly sending the system information required by repeated transmission times corresponding to the highest coverage enhancement grade; or, selecting, by the base station, a resource for repeatedly sending the system information required by repeated transmission times corresponding to a coverage enhancement grade corresponding to a local cell to send the system information according to a coverage enhancement requirement of the local cell.

4. The method according to claim 1, wherein the system information is one of four system information coded blocks on a broadcast channel in the transmission period for the system information; and the system information coded block are selected as the same one as coded blocks corresponding to the system information repeatedly sent in a radio frame, or the system information coded blocks are selected according to a predefined sequence, wherein the repeated transmission times is a multiple of four, and the transmission period for the system information comprises four radio frames.

5. The method according to claim 1, wherein selection of the resource for repeatedly sending the system information comprises:
when one subframe of one transmission period for the system information is required to comprise more than one resource for repeatedly sending the system information,
performing intra-subframe selection, and then performing inter-subframe selection; or
performing inter-subframe selection, and then performing intra-subframe selection.

6. The method according to claim 1, wherein a selection principle of subframes corresponding to the resource for repeatedly sending the system information comprises that:
subframes of a first half of a frame are preferably selected;
the subframes of a second half and the first half of the frame are sequentially alternately selected; and
the subframes are selected according to a predefined subframe priority sequence.

7. The method according to claim 1, wherein an Orthogonal Frequency Division Multiplexing (OFDM) symbol position of the system information in each subframe is the same; or,
OFDM symbol positions of the system information in the subframes with the same subframe type are the same.

8. The method according to claim 1, wherein the step of sending the system information comprises:
mapping the system information to frequency-domain positions of the resource for repeatedly sending in other subframes or the same subframe according to an original frequency-domain position for sending the system information in subframe 0, and keeping a surplus subcarrier idle in the case that the surplus subcarrier exists; and in the case that system information mapping positions on any OFDM symbol are fewer than system information mapping positions on an original OFDM symbol, sending the system information with part codes cancelled.

9. A method for transmitting system information, comprising:
receiving, by a terminal, the system information, and detecting the system information,
wherein the system information comprises: system information sent on a broadcast channel and system information sent on a resource for repeatedly sending the system information,
wherein the method further comprises:
after detecting the system information, determining, by the terminal, a coverage enhancement grade,
wherein the step of determining the coverage enhancement grade comprises: determining, by the terminal, the coverage enhancement grade according to repetition times corresponding to decoding of the system information,
wherein the coverage enhancement grades comprise one or more preset grades, and the coverage enhancement grades respectively correspond to different system information repeated transmission times, and wherein system information repeated transmission times corresponding to a high coverage enhancement grade is bigger than system information repeated transmission times corresponding to a low coverage enhancement grade.

10. The method according to claim 9, wherein the step of determining, by the terminal, the coverage enhancement grade of the terminal according to the repetition times corresponding to decoding of the system information comprises:
decoding, by the terminal, the system information sent on the broadcast channel, determining that there is no coverage enhancement grade required for the coverage enhancement in the case of succeeding in decoding, and normally performing subsequent operation; and
in case of failing in decoding, sequentially combining and decoding data received on the broadcast channel and data received on resources for repeatedly sending the system information corresponding to different coverage enhancement grades until succeeding in decoding, and acquiring, by the terminal, the coverage enhancement grade of the terminal; or, determining, by the terminal, an initial coverage enhancement grade according to a downlink reference signal or a synchronization channel, and then determining a final coverage enhancement grade according to the lowest coverage enhancement grade when the system information is successfully decoded.

11. A base station, comprising: a processing module and a sending module, wherein
the processing module is configured to determine a position of a resource for repeatedly sending system information in a transmission period for the system information according to repeated transmission times for repeatedly sending the system information; and
the sending module is configured to send the system information on the resource for repeatedly sending the system information determined by the processing module,
wherein the position of the resource for repeatedly sending the system information in the transmission period for the system information is characterized in that:
a resource for repeatedly sending the system information corresponding to a high coverage enhancement grade comprises a resource for repeatedly sending the system information corresponding to a low coverage enhancement grade,
wherein the coverage enhancement grades comprise one or more preset grades, and the coverage enhancement grades respectively correspond to different system information repeated transmission times; and wherein system information repeated transmission times corresponding to the high coverage enhancement grade is bigger than system information repeated transmission times corresponding to the low coverage enhancement grade.

12. The base station according to claim 11, wherein
the sending module is configured to select the same one as coded blocks corresponding to the system information repeatedly sent in a radio frame for repeated transmission, or select the coded blocks according to a predefined sequence for repeated transmission, wherein the times of repeated transmission is a multiple of four.

13. The base station according to claim 11, wherein
the sending module is configured to, when one subframe of one transmission period for the system information is required to comprise more than one resource for repeatedly sending the system information, perform intra-subframe selection, and then perform inter-subframe selection; or perform inter-subframe selection, and then perform intra-subframe selection.

14. A terminal, comprising:
a receiving module, configured to receive system information; and a detection module, configured to detect the system information, wherein the system information comprises: system information sent on a broadcast channel and system information sent on a resource for repeatedly sending the system information, wherein the detection module is configured to determine a coverage enhancement grade, wherein a method for determining the coverage enhancement grade comprises that: the terminal determines the coverage enhancement grade according to repetition times corresponding to decoding of the system information;

wherein the coverage enhancement grades comprise one or more preset grades, and the coverage enhancement grades respectively correspond to different system information repeated transmission times, and wherein system information repeated transmission times corresponding to a high coverage enhancement grade is bigger than system information repeated transmission times corresponding to a low coverage enhancement grade.

15. The terminal according to claim 14, wherein the detection module is configured to decode the system information sent on the broadcast channel, determine that there is no coverage enhancement grade required for the coverage enhancement in the case of succeeding in decoding, and normally) performing subsequent operation; and in case of failing in decoding, sequentially combine and decode data received on the broadcast channel and data received on resources for repeatedly sending the system information corresponding to different coverage enhancement grades until succeeding in decoding, and acquire the coverage enhancement grade of the terminal;

determine an initial coverage enhancement grade according to a downlink reference signal or a synchronization channel, and then determine a final coverage enhancement grade according to the lowest coverage enhancement grade when the system information is successfully decoded.

* * * * *